(12) United States Patent
Lavallee et al.

(10) Patent No.: US 7,681,130 B1
(45) Date of Patent: Mar. 16, 2010

(54) METHODS AND APPARATUS FOR DISPLAYING NETWORK DATA

(75) Inventors: James E. Lavallee, Boylston, MA (US); Alexander Dubrovsky, Westborough, MA (US); Francois Gauvin, Salem, MA (US); Freda Weinbrecht, Dracut, MA (US)

(73) Assignee: EMC Corporation, Hopkinton, MA (US)

( * ) Notice: Subject to any disclaimer, the term of this patent is extended or adjusted under 35 U.S.C. 154(b) by 927 days.

(21) Appl. No.: 11/394,651

(22) Filed: Mar. 31, 2006

(51) Int. Cl.
*G06F 3/00* (2006.01)
*G06F 15/177* (2006.01)
(52) U.S. Cl. .................. 715/735; 715/736; 715/738
(58) Field of Classification Search ......... 715/735–738, 715/853–856; 709/222, 223
See application file for complete search history.

(56) References Cited

U.S. PATENT DOCUMENTS 6,950,871 B1 * 9/2005 Honma et al. ............... 709/223

2006/0271677 A1 * 11/2006 Mercier ...................... 709/224

* cited by examiner

*Primary Examiner*—Weilun Lo
*Assistant Examiner*—Truc T Chuong
(74) *Attorney, Agent, or Firm*—Chapin IP Law, LLC

(57) ABSTRACT

A method for displaying graphically interconnected network fabrics on a graphical user interface. The method disclosed herein is a view manager that identifies fabrics (e.g., storage area networks) in a network system and then displays graphical representations of the fabrics within a graphical user interface. In this manner, the fabric representations are displayed in respective regions of the graphical user interface such that the pixels of each fabric representation do not overlap. Graphical interconnections are displayed between network fabrics to represent the relationship and connectivity between the fabrics. Additionally, the view manager displays the physical and virtual components or resources (e.g., host computers, switch devices, storage devices) that make up the network fabrics as graphical objects within the fabric representations. In order to show the relationship and connectivity between the resource objects, the view manager also displays graphical interconnections that flow between the resources.

18 Claims, 19 Drawing Sheets

230
RECEIVE A SELECTION OF A LAYOUT OF THE TOPOLOGY VIEW, THE LAYOUT DEFINING AN ARRANGEMENT OF THE FABRIC REPRESENTATIONS WITHIN THE TOPOLOGY VIEW

231
RECEIVE A SELECTION OF A GRID TOPOLOGY WHEREBY THE GRID TOPOLOGY INDICATES THAT THE FABRIC REPRESENTATIONS IN THE TOPOLOGY VIEW ARE TO BE ARRANGED IN RESPECTIVE COLUMNAR REGIONS

AND/OR

232
RECEIVE A SELECTION OF A CIRCULAR TOPOLOGY WHEREBY THE CIRCULAR TOPOLOGY INDICATES THAT THE FABRIC REPRESENTATIONS IN THE TOPOLOGY VIEW ARE TO BE ARRANGED IN A GENERALLY CIRCULAR ARRANGEMENT

AND/OR

233
RECEIVE A SELECTION OF A STAR TOPOLOGY WHEREBY THE STAR TOPOLOGY INDICATES THAT THE FABRIC REPRESENTATIONS IN THE TOPOLOGY VIEW ARE TO BE ARRANGED IN STAR FORMAT

FROM FIGURE 7A

---

234
DISPLAY A GRAPHICAL REPRESENTATION OF INTERCONNECTIONS BETWEEN FABRIC REPRESENTATIONS IN THE TOPOLOGY VIEW OF EACH FABRIC OF THE PLURALITY OF NETWORKED FABRICS

235
UPON DETERMINING THAT THE SELECTION OF THE LAYOUT OF THE TOPOLOGY VIEW IS A GRID TOPOLOGY, DISPLAY GRAPHICAL GRID-BASED INTERCONNECTIONS BETWEEN THE FABRIC REPRESENTATIONS, THE GRAPHICAL GRID-BASED INTERCONNECTIONS FOLLOWING AT LEAST PORTIONS OF GRID LINES BETWEEN THE FABRIC REPRESENTATIONS ON THE GRAPHICAL USER INTERFACE

AND/OR

236
UPON DETERMINING THAT THE SELECTION OF THE LAYOUT OF THE TOPOLOGY VIEW IS A STAR TOPOLOGY, DISPLAY GRAPHICAL STAR-BASED INTERCONNECTIONS BETWEEN THE FABRIC REPRESENTATIONS, THE GRAPHICAL STAR-BASED INTERCONNECTIONS EXTENDING OUTWARDS FROM THE CENTRAL FABRIC REPRESENTATION TO REMAINING FABRIC REPRESENTATIONS IN THE TOPOLOGY VIEW DISPLAYED SURROUNDING THE CENTRAL FABRIC REPRESENTATION

AND/OR

237
UPON DETERMINING THAT THE SELECTION OF THE LAYOUT OF THE TOPOLOGY VIEW IS A CIRCULAR TOPOLOGY, DISPLAY GRAPHICAL ARC-BASED INTERCONNECTIONS BETWEEN THE FABRIC REPRESENTATIONS ARRANGED IN A GENERALLY CIRCULAR MANNER

---

238
IN RESPONSE TO RECEIVING THE SELECTION OF A LAYOUT OF THE TOPOLOGY VIEW, GRAPHICALLY ARRANGE THE FABRIC REPRESENTATIONS IN RESPECTIVE FABRIC DISPLAY REGIONS THAT CONFORM TO THE LAYOUT OF THE TOPOLOGY VIEW

*FIG. 7B*

METHODS AND APPARATUS FOR DISPLAYING NETWORK DATA

BACKGROUND

Conventional computer systems that operate software applications designed for interaction with users often provide a graphical user interface enabling such interaction. Some software applications are designed to perform network management to control and manage an interconnection of computer systems and other devices. Often such applications provide a graphical user interface to assist the operator in management of the network. The graphical user interface can include information relative to the structure and operation of the network (e.g., local area network "LAN", wide area network "WAN", storage area network "SAN", etc.). Typically, conventional computer systems that employ graphical user interfaces can display these network structures as graphical objects or icons representing the physical and/or virtual resources contained within the network environment. A user may then access certain information regarding the network resources by selecting the desired network resource representation in a view of the graphical user interface.

Additionally, conventional graphical user interfaces are able to display a topology of a network. As an example, conventional computer systems can display a single network fabric of a storage area network in the graphical user interface that represents the network resources and interconnections between those resources in that fabric. Storage area network management differs from general network management in that storage area networks or SANs define an interconnection of host computer systems through one or more switches to storage devices such as disk drives that are either logical devices or physical entities. The data transmitted on SAN networks are input-output (I/O) requests for data. Generally, in a SAN a network fabric thus defines a set of one or more host computers that are mapped to storage devices via switch devices. Each host computer in a conventional network fabric typically operates software, sometimes referred to as an agent, that executes as a computer process for retrieving and transmitting status and diagnostic information pertaining to a resource to a central network management application. There may be many types of agents that collect data on many different types of SAN resources within a given fabric. In turn, the status and diagnostic information is transmitted, directly or indirectly by each agent, to a management computer system operating the graphical user interface as part of a network management application for display to the network manager (i.e. operator).

SUMMARY

Conventional technologies that have graphical user interfaces for displaying storage area network information such as network fabric topology graphical user interfaces suffer from a variety of deficiencies. In particular, such technologies do not support the ability for displaying multiple network fabrics of a large SAN environment in a single graphical user interface. In particular, the system disclosed herein is based in part on the observation that large enterprise networks are evolving to include multiple SAN fabrics instead of a single fabric. In particular, a large enterprise may have numerous fabrics in a given SAN, with each fabric having its own interconnection of host computers, switches and storage. To further complicate this network environment, each fabric in a large enterprise SAN network might operate different I/O path transport technology, such that one fabric might use Fiberchannel as a transport mechanism, while another uses SCSI over IP (known as ISCSI), while still another fabric might provide a logical SAN or LSAN. These different fabrics might be interconnected by SAN bridging devices to allow hosts in one fabric to obtain I/O access to data in other fabrics.

Conventional SAN management applications do not provide a data model, nor a graphical user interface that includes a topology view that can display or render multiple fabrics from a SAN environment at the same time. For example, using a conventional SAN management graphical user interface, a user (e.g., network administrator) would not be able to view more than one network fabric representation (e.g., SAN) in a single graphical user interface at a given time. To do so, the user would have to close or deselect the current view of a first fabric representation and then open or select a second fabric representation for viewing. Similarly, the user may have to open more than one graphical user interface to view each fabric representation included in the network system.

Another drawback resulting from the inability to display multiple network fabrics is that conventional systems do not provide a means for displaying a graphical interconnection between those network fabrics. This deficiency is amplified with the ever-increasing size and scope of physical data networks and data storage systems. As an example, with traditional systems a network administrator cannot view a graphical representation of the interactions and communications between at least two network fabrics (e.g., remote SAN's). In large network systems having numerous network fabrics, the ability to view representations of interconnections between network fabric representations can be a valuable asset in the administration and maintenance of the network systems.

Embodiments disclosed herein provide a system for viewing topology views of modern SAN configurations in which multiple fabrics are interconnected with each other. The system may be embodied in a SAN management software application that includes a view manager that provides the ability to view multiple network segments, generally referred to as fabrics, on the same view of a graphical user interface. Embodiments of the view manager process disclosed herein therefore substantially overcome the aforementioned drawbacks. The view manager identifies fabrics (e.g., SAN's) in a network system and then concurrently displays graphical representations of the fabrics within a single view on the graphical user interface. The fabric representations are concurrently displayed in respective regions of the view on the graphical user interface such that the pixels of each fabric representation do not overlap (as opposed to attempting to show multiple fabrics in which, for example, all hosts, switches and storage devices from one fabric are collocated with all hosts, switches and devices from another fabric). As will be discussed further, graphical interconnections can be displayed between network fabrics to represent the relationship and connectivity between these fabrics. Additionally, the view manager can display the physical and virtual resources (e.g., host computers, switch devices, storage devices) that make up the network fabrics as graphical objects within the fabric representations. In order to show the relationship and connectivity between the resource objects, the view manager also displays graphical interconnections that flow between these resource objects.

As an example, suppose a large enterprise maintains distinct SAN configurations, each as a separate fabric. Each different fabric might be a SAN for a respective department of the enterprise. The fabrics might be considered as segments, and the segments might be interconnected with each other via SAN segment or fabric connectivity devices, such as bridges or other SAN I/O data communications switches. Using the view manager disclosed herein, the administrator of these different fabrics is able to view each of the different fabrics as separate topology view in a separate region of a graphical user interface. For example, if there are four different SAN segments or fabrics, the topology view may be divided into four regions (e.g. each ¼ of the size of the total topology viewing area) and each of the four fabrics is displayed in a respective region. Additionally, the view manager allows the display of a topology for each fabric in each region in accordance with a different type of topology view. Thus the administrator might prefer to view a first SAN fabric in a star topology view, while a second is shown as a vertical column view (in which hosts, SAN switches, and storage devices are arranged in respective columns), and the third view might be shown in another topology layout such as circular, and so forth.

Each region showing a respective topology for a single fabric of a multi-fabric SAN can show the layout of hosts, switches and storage devices in accordance with that view type (e.g. star, column, row, random, etc.). The user is able to select the type of view for a particular region. Other features allow a user to expand one region while the others automatically collapse. Still other features include the ability to mouse over an icon of a device or other resource in a region and state information for that resource will be shown. The view manager can further display interconnections between regions, so show that hosts in one fabric can access stored data in another fabric.

In one embodiment of the system described herein, the view manager displays state information relative to a network resource when the state of that resource changes. For example, assume that a graphical user interface represents a plurality of network fabrics each containing a variety of host computer objects and storage device objects. As such, in an example embodiment the view manager would display state information related to a host computer if the state of that host computer were to change (e.g., an error was detected). Moreover, in another embodiment, the view manager displays the state information of a network resource (e.g., storage device) when a user actively selects the network resource (e.g., the user places the mouse cursor over the resource). In such a case, the view manager shows resource state information even though the state of the particular resource object has not changed.

With respect to another example embodiment described herein, the view manager displays network fabrics in various topologies in the graphical user interface. For example, in one embodiment the view manager displays the networked fabrics in a grid topology such that fabric representations are shown in logical rows and columns. A second embodiment has the network fabrics configured in a circular topology whereby the fabric representations are displayed in a substantially circular layout. In a third example embodiment, the view manager displays the fabric representations in a star topology. Similar to a hub and spoke configuration, the star topology includes a central fabric with auxiliary fabric representations connected to and surrounding the central fabric. In each topological embodiment described thus far, the view manager displays graphical interconnections that logically represent the relationship between each fabric representation in the graphical user interface.

Other configurations allow a user to edit the topology. This allows a user to change the topology layout manually to adjust to personal preferences. Still other features allow the user to save the current layout. The user can save the layout where the layout is one of the standard views, or a modified topology. In general, save means to persist and to display the same layout the next time the user brings up the view of the topology. In one configuration, this saved layout becomes the new starting point in the management application.

In yet another embodiment discussed further herein, the view manager displays a hierarchical tree in the graphical user interface that corresponds to the fabric representations. As an example, in one configuration the hierarchical tree is presented in a collapsible and expandable form and corresponds to graphical objects in the graphical user interface that are also in a collapsible and expandable form. In operation, when a user either collapses or expands a resource in the hierarchical tree, the view manager collapses or expands the corresponding graphical object in the graphical user interface. Likewise, the collapse or expansion of a graphical object in the graphical user interface will cause the view manager to collapse or expand the corresponding hierarchical tree element.

Configurations described herein further provide a method for identifying network information to be rendered on a graphical user interface whereby the network information identifies a plurality of networked fabrics, and each networked fabric indicates an interconnection of host computer systems mapped to storage resources. In one configuration the view manager identifies switch devices that couple the host computer systems and storage devices. For example, the view manager may identify a plurality of SAN systems each containing various host computer, switch device and storage device resources.

Furthermore, for each fabric of the plurality of networked fabrics, the view manager displays a fabric representation of that fabric in a respective fabric display region of a topology view on the graphical user interface. In this fashion, the representation of each fabric in each respective fabric display region includes graphical host objects graphically interconnected to graphical storage objects to represent the host computer systems mapped to the storage resources in the fabric represented in that fabric display region.

Additionally, a sample configuration provides for the view manager to display a graphical representation of interconnections between fabric representations in the topology view of each fabric of the plurality of networked fabrics. The graphical interconnections may describe a relationship between entire network fabrics, between network resources in different network fabrics, or a combination of both. As will be discussed further, the configuration of the graphical interconnections is dependent upon the type of fabric topology that has been selected.

Other embodiments of the invention include any type of computerized device, workstation, handheld or laptop computer, or the like configured with software and/or circuitry (e.g., a processor) to process any or all of the method operations disclosed herein. In other words, a computerized device or a processor that is programmed or configured to operate in accordance with the system as explained herein is considered an embodiment of the invention.

Other embodiments of the invention that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor and a display, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

It is to be understood that the system of the present application can be embodied solely as a software program, or as a software program operating in conjunction with corresponding hardware. For example, embodiments of the present application may be implemented in EMC's Control Center (ECC) software application that provides graphical management functionality of storage area network resources. Embodiments of the present application may also be implemented in computer devices that operate in connection with the Control Center (ECC) software. Control Center software is manufactured by EMC Corporation of Hopkinton, Mass., USA.

BRIEF DESCRIPTION OF THE DRAWINGS

The foregoing and other objects, features, and advantages of the present application will be apparent from the following more particular description of preferred embodiments of the present disclosure, as illustrated in the accompanying drawings in which like reference characters refer to the same parts throughout the different views. The drawings are not necessarily to scale, with emphasis instead being placed upon illustrating the embodiments, principles and concepts.

FIGS. 7a and 7b are flow charts of processing steps that show high-level processing operations performed by the view manager process when it receives a selection of a layout of the topology view and displays a graphical representation of interconnections between fabric representations in the topology in accordance with one example configuration of the invention.

DETAILED DESCRIPTION

Figure 1:
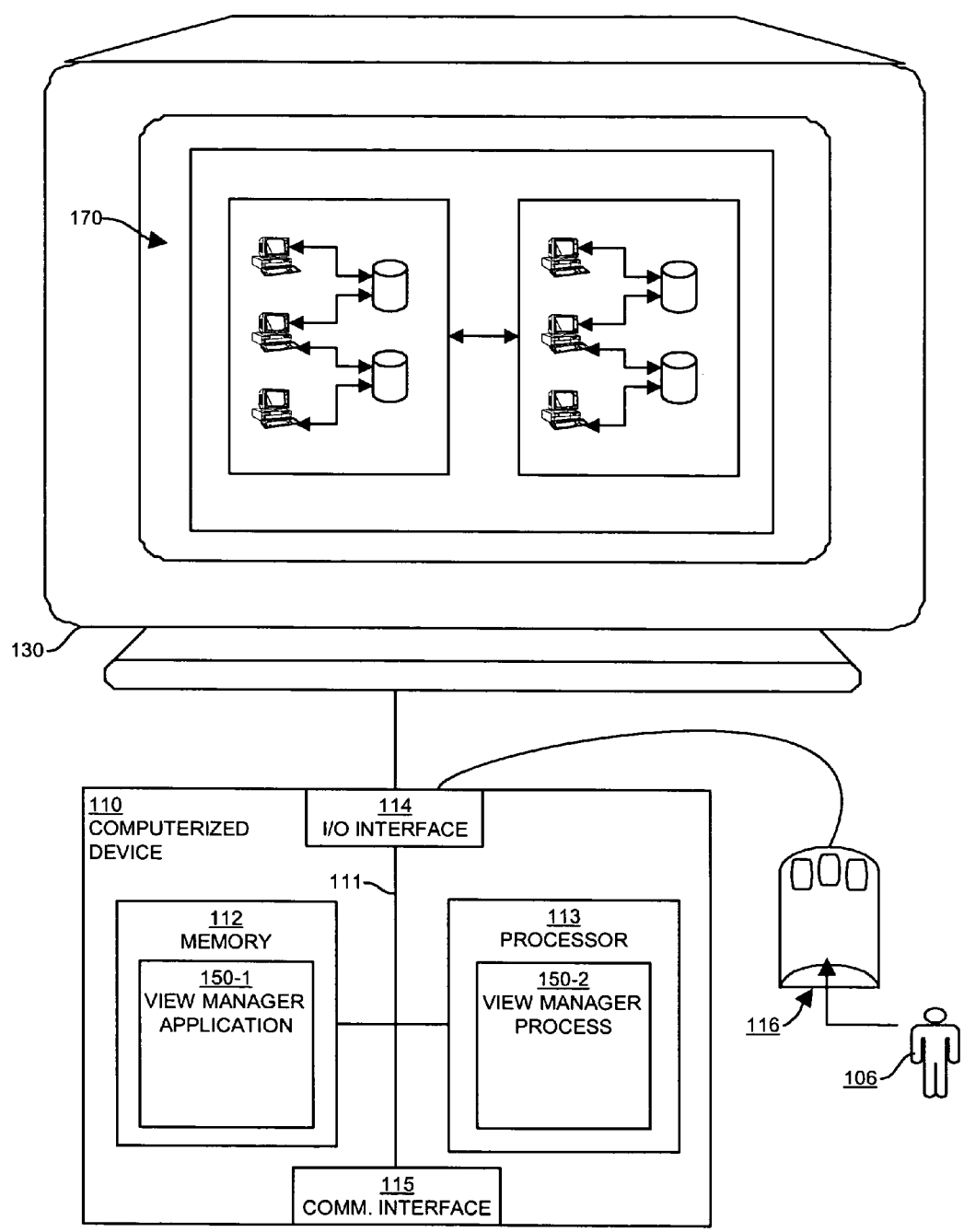
FIG. 1 is a block diagram of a computerized system configured with a view manager application including a view manager process in accordance with one embodiment of the invention.

FIG. 1 is a block diagram illustrating example architecture of a computer system 110 that executes, runs, interprets, operates or otherwise performs a view manager application 150-1 and process 150-2 configured in accordance with embodiments of the invention. The computer system 110 may be any type of computerized device such as a personal computer, workstation, portable computing device, console, laptop, network terminal or the like. As shown in this example, the computer system 110 includes an interconnection mechanism 111 such as a data bus, motherboard or other circuitry that couples a memory system 112, a processor 113, an input/output interface 114, and a communications interface 115. An input device 116 (e.g., one or more user/developer controlled devices such as a keyboard, mouse, touch pad, etc.) couples to the computer system 110 and processor 113 through an input/output (I/O) interface 114 and enables a user 106 to provide input signals and generally control a graphical user interface 170 that the view manager application 150-1 and process 150-2 provides on the computer display 130.

The memory system 112 is any type of computer readable medium and in this example is encoded with a view manager application 150-1 that supports generation, display, and implementation of functional operations as explained herein. The view manager application 150-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the view manager application 150-1. Execution of the view manager application 150-1 in this manner produces processing functionality in a view manager process 150-2. In other words, the process 150-2 represents one or more portions or runtime instances of the application 150-1 (or the entire application 150) performing or executing within or upon the processor 113 in the computerized device 110 at runtime.

Further details of configurations explained herein will now be provided with respect to flow charts of processing steps that show the high level operations disclosed herein to perform the view manager process 150-2, as well as graphical representations that illustrate implementations of the various configurations of the view manager process 150-2.

Figure 2:
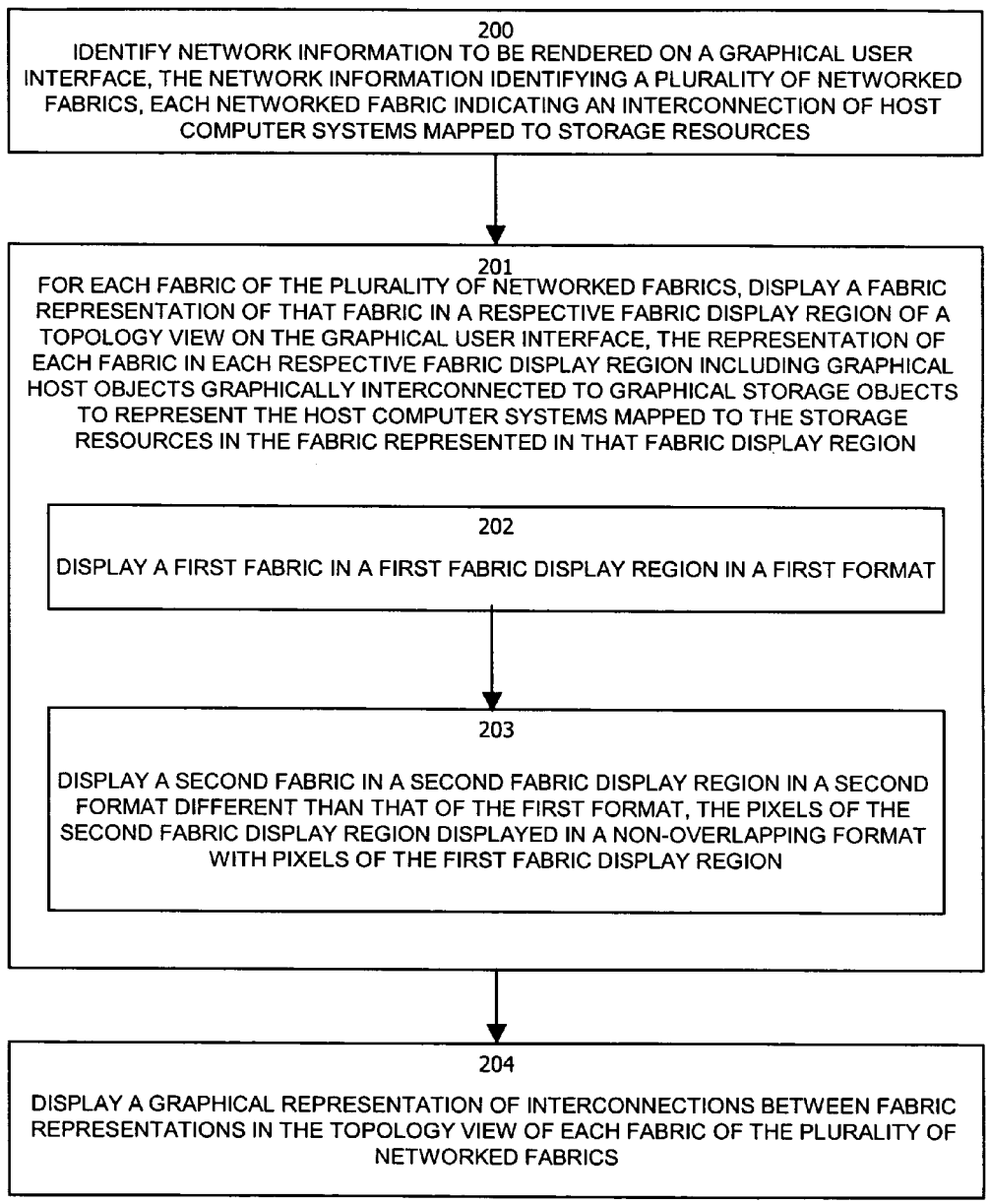
FIG. 2 is a flow chart of processing steps that shows high-level processing operations performed by the view manager process when it displays network information in accordance with one example configuration of the invention.

FIG. 2 is a flow chart of processing steps the view manager 150 performs to display network information in accordance with one example embodiment.

In step 200, the view manager 150 identifies network information to be rendered on a graphical user interface whereby the network information identifies a plurality of networked fabrics, and each networked fabric indicates an interconnection of host computer systems mapped to storage resources.

In step 201, for each fabric of the plurality of networked fabrics, the view manager 150 displays a fabric representation of that fabric in a respective fabric display region of a topology view on the graphical user interface. In this manner, the representation of each fabric in each respective fabric display region includes graphical host objects graphically interconnected to graphical storage objects to represent the host computer systems mapped to the storage resources in the fabric represented in that fabric display region.

Figure 3:
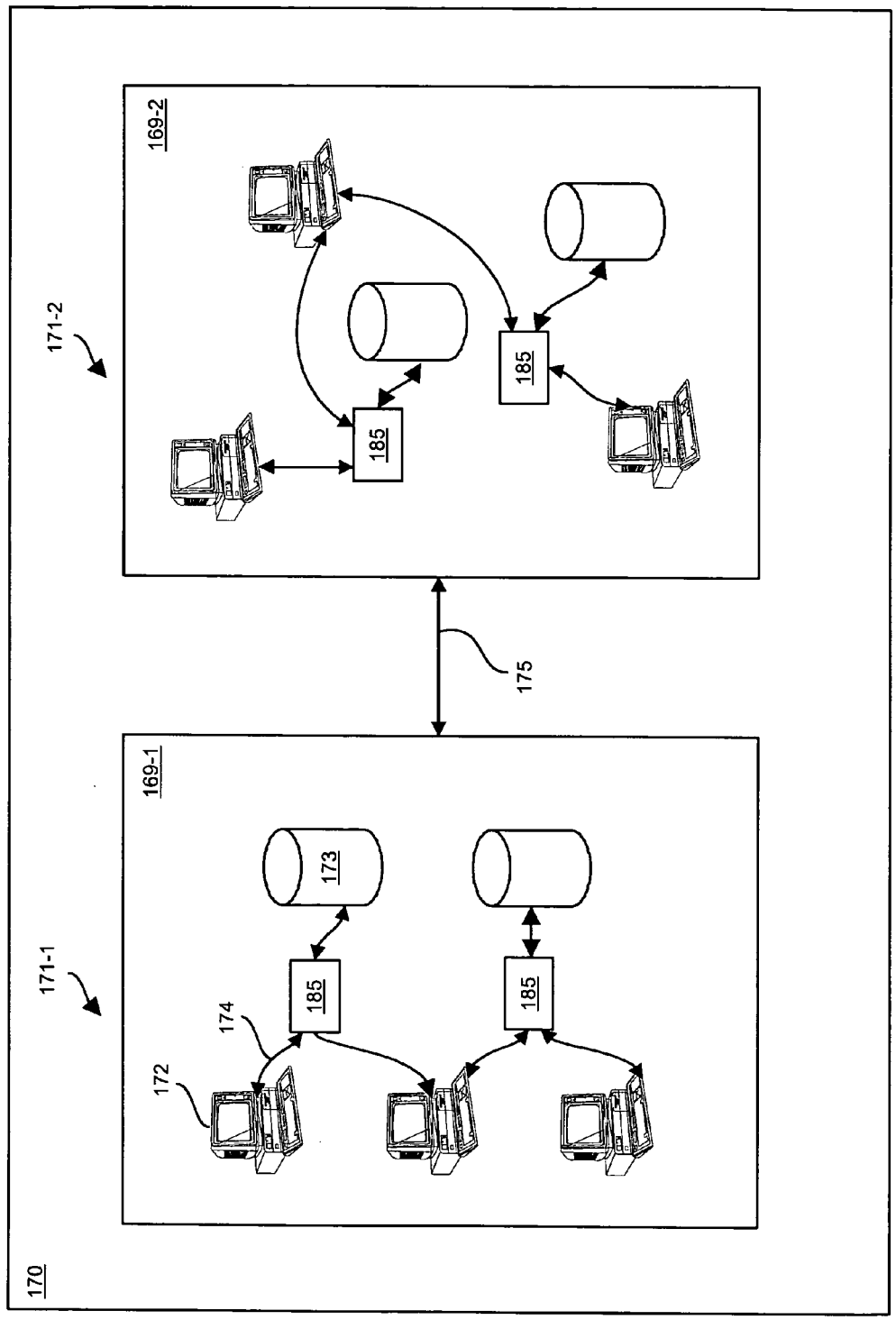
FIG. 3 is a graphical representation that illustrates one implementation of the view manager process as a graphical user interface displaying a first fabric representation and a second fabric representation.

For example, FIG. 3 illustrates an example configuration whereby a plurality of networked fabrics 171-1 and 171-2 are represented in the graphical user interface 170 in respective fabric display regions 169-1 and 169-2. In this particular embodiment, network fabric 171-1 includes graphical host objects 172 interconnected via switches 185 to graphical storage objects 173 via graphical interconnections 174. Note in some figures of the graphical user interface discussed herein, switches are not shown, whereas in other figures of the graphical user interface, switches are shown. In one configuration, it is up to the user if he or she desires to view the switches in the fabric.

In step 202, the view manager 150 displays a first fabric in a first fabric display region in a first format. As shown in the example configuration of FIG. 3, the graphical user interface 170 displays a first fabric 171-1 in a first display region 169-1 in a first format.

In step 203, the view manager 150 displays a second fabric in a second fabric display region in a second format different than that of the first format such that the pixels of the second fabric display region are displayed in a non-overlapping format with pixels of the first fabric display region. For example, FIG. 3 displays a second fabric 171-2 in a second fabric display region 169-2 in a second format different than that of the first format. It should be noted that first fabric display region 169-1 does not overlap with second fabric display region 169-2 and, thus, both fabrics representation occupy distinct regions within graphical user interface 170.

Figure 18:
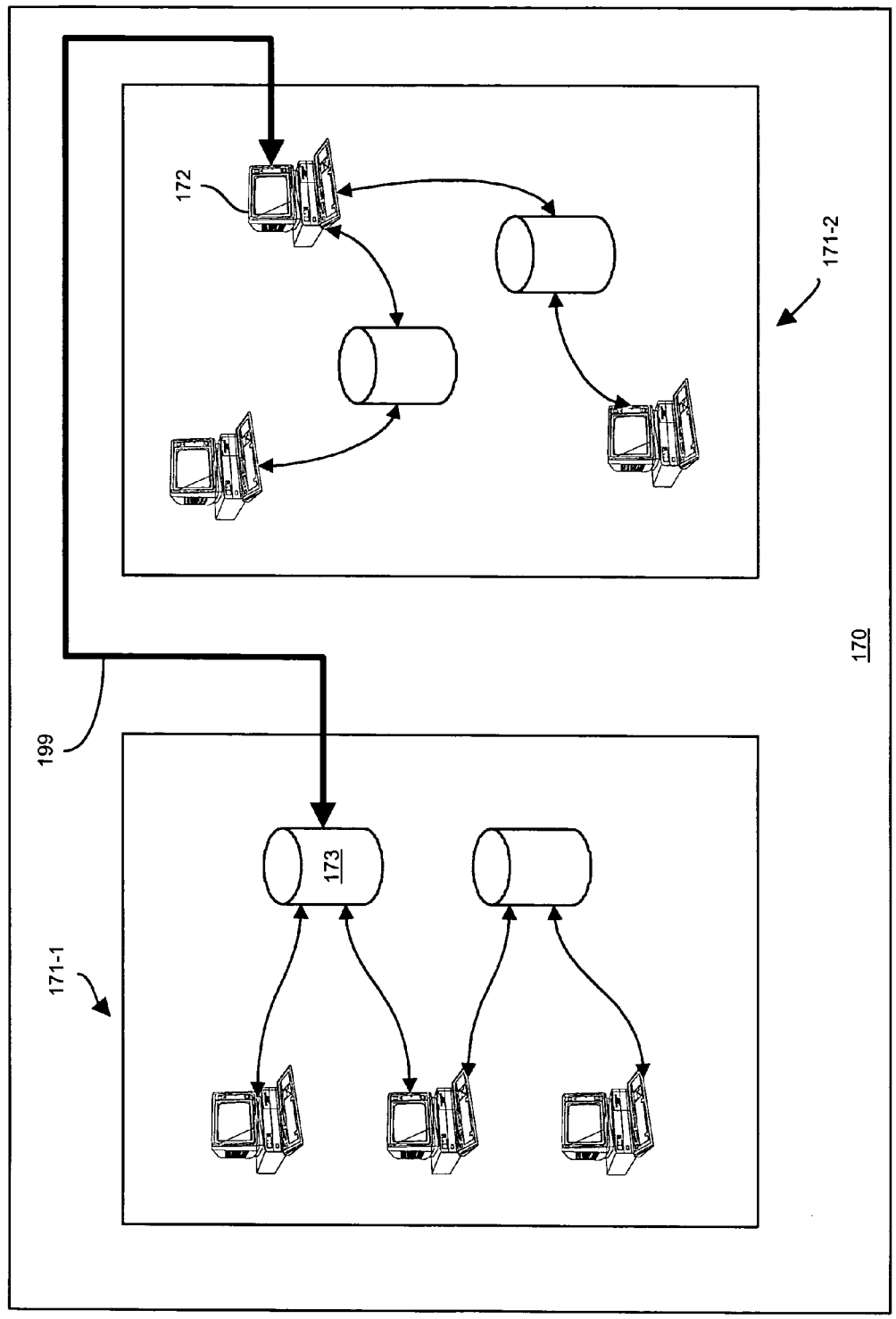
FIG. 18 is a graphical representation that illustrates one implementation of the view manager process as a graphical user interface displaying an optimal path between fabric representations in the graphical user interface.

In step 204, the view manager 150 displays a graphical representation of interconnections between fabric representations in the topology view of each fabric of the plurality of networked fabrics. As depicted in FIG. 3, graphical user interface 170 displays the first fabric representation 171-1 coupled to the second fabric representation 171-2 via graphical interconnection 175. As will be discussed further, a graphical interconnection may connect to a fabric representation (as shown in FIG. 3), or to discreet resources (e.g., host computer objects or other switches) within the fabric representation (as shown in FIG. 18). Moreover, in an alternate configuration a graphical interconnection may couple a fabric representation to a resource within another fabric representation.

Figure 4:
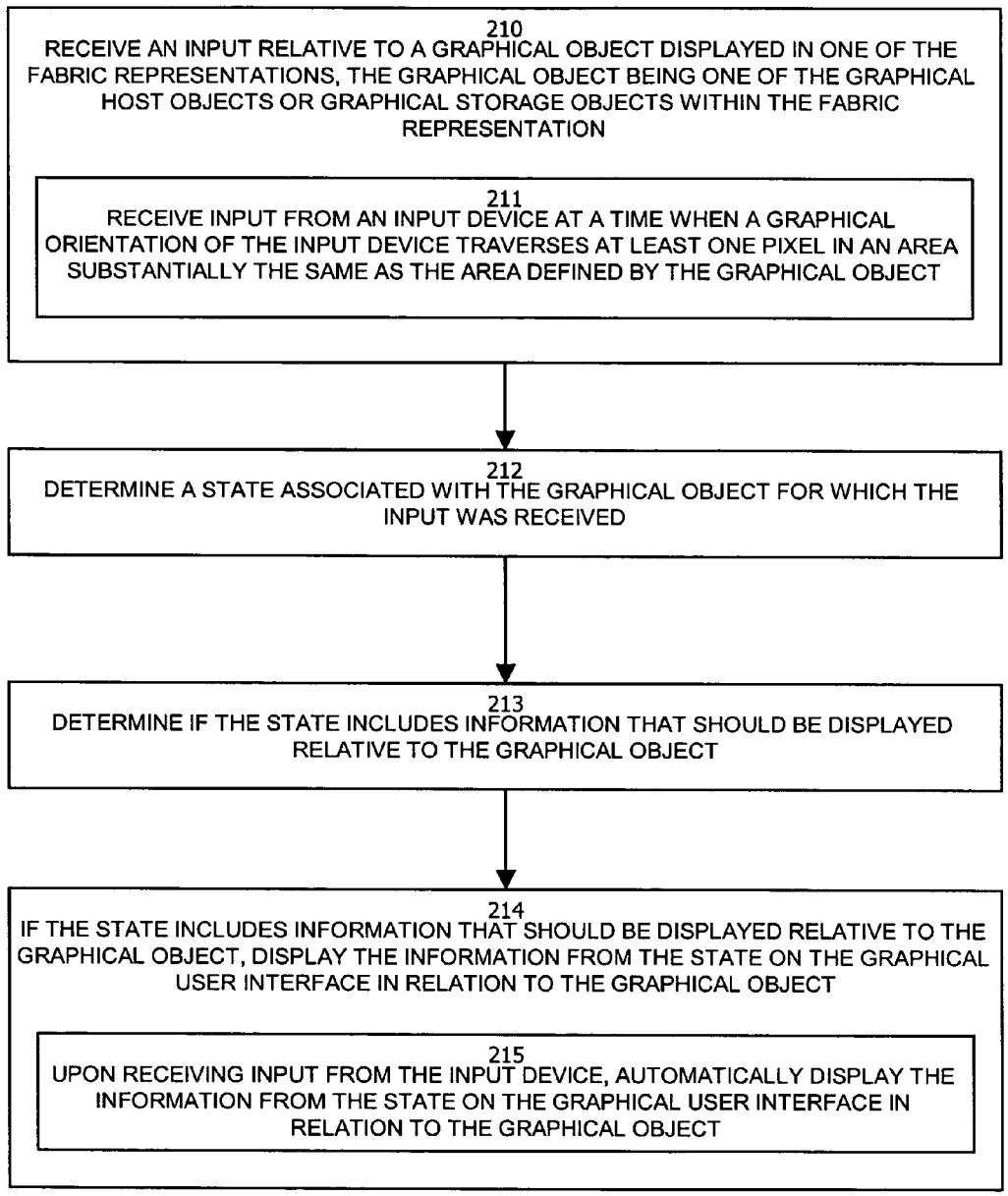
FIG. 4 is a flow chart of processing steps that shows high-level processing operations performed by the view manager process when it receives an input relative to a graphical object displayed in one of the fabric representations in accordance with one example configuration of the invention.

FIG. 4 is a flow chart of processing steps the view manager 150 performs to display network information in addition to steps already discussed herein and in accordance with one example embodiment.

In step 210, the view manager 150 receives an input relative to a graphical object displayed in one of the fabric representations whereby the graphical object is either a graphical host object or a graphical storage object within the fabric representation. In example configurations, the input relative to the graphical object may be from a user and/or a computer process.

Figure 5:
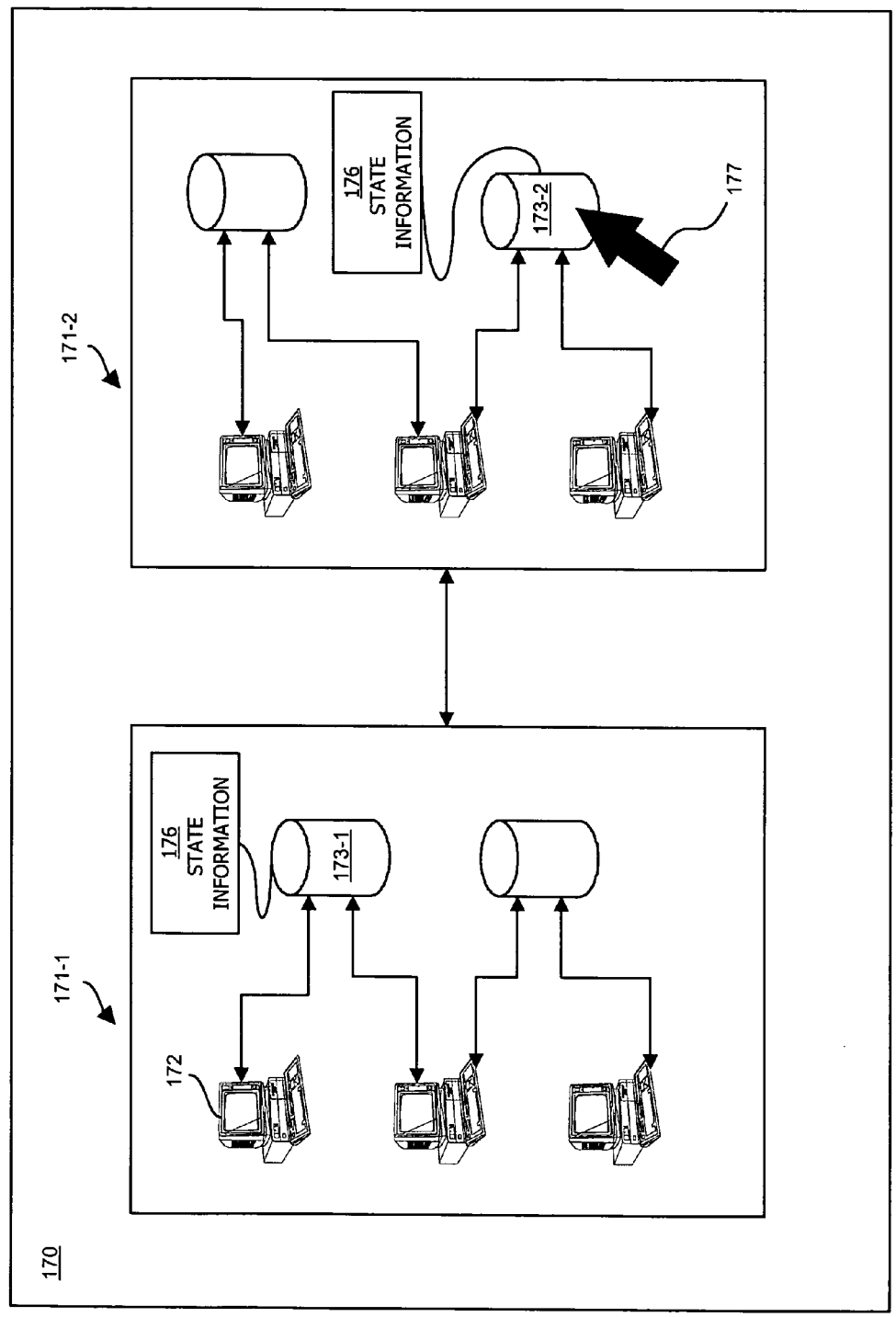
FIG. 5 is a graphical representation that illustrates one implementation of the view manager process as a graphical user interface displaying state information relative to a graphical object.

In step 211, the view manager 150 receives input from an input device at a time when a graphical orientation of the input device traverses at least one pixel in an area substantially the same as the area defined by the graphical object. For instance, in one example embodiment the input device 116 is a mouse represented by a graphical icon (e.g. a mouse pointer) in the graphical user interface. As shown in FIG. 5, a graphical representation 177 of an input device (e.g., mouse cursor or pointer) traverses a storage device object 173-2 such that pixels of the mouse cursor overlap pixels of the storage device object 173-2 (or are within a predetermined distance). As a result, view manager 150 receives input such as a mouse event indicating that the input device 177 is traversing storage device object 173-2. The input may merely indicate that a user has selected the particular graphical object by mousing over, or placing the mouse cursor over or nearby the graphical object. In an alternate configuration, a user must enter at least one mouse click in addition to traversing the graphical object with the mouse in order to provide input to the view manager 150.

In step 212, the view manager 150 determines a state associated with the graphical object for which the input was received. The state is the operational status of the physical or virtual object (e.g., host computer, storage device, etc.) and generally indicates whether the device is operating properly (e.g., monitoring checksum data). For example, in one configuration the state is a binary signal that represents whether a storage device or host computer is working properly or has encountered errors based on certain criteria. Moreover, in an alternate embodiment the state may indicate additional diagnostic information (e.g., throughput data, number of active users, number of devices, etc). The state may depend on the object, thus state for a host may be different than state for a SAN switch, and for a storage array, etc.

In step 213, the view manager 150 determines if the state includes information that should be displayed relative to the graphical object. Generally, the view manager 150 will display state information if the physical object is not operating properly. Accordingly, displaying state information serves as a type of warning or alert indicating that the physical object is not functioning properly or that an error has occurred in the device.

In step 214, if the state includes information that should be displayed relative to the graphical object, the view manager 150 displays the information from the state on the graphical user interface in relation to the graphical object. For example, FIG. 5 depicts a graphical user interface 170 having a first fabric representation 171-1 that includes, inter alia, a first storage device 173-1. In this example, the view manager 150 has determined that the state of the first storage device 173-1 includes information (e.g., an error code) that should be displayed relative to the device object. As a result, the view manager 150 displays state information 176-1 relative to the first storage device 173-1. It should be noted that the state information may include information such as, but not limited to, device status, error codes, diagnostic information, and the like.

In step 215, upon receiving input from the input device, the view manager 150 automatically displays the information from the state on the graphical user interface in relation to the graphical object. As shown in the sample embodiment of FIG. 5, the view manager 150 receives input from the input device 116 as the mouse cursor 177 traverses storage device object 173-2. Upon receiving this input, the view manager 150 automatically displays state information 176-2 on the graphical user interface 170 in relation to the storage device 173-2.

Figure 6:
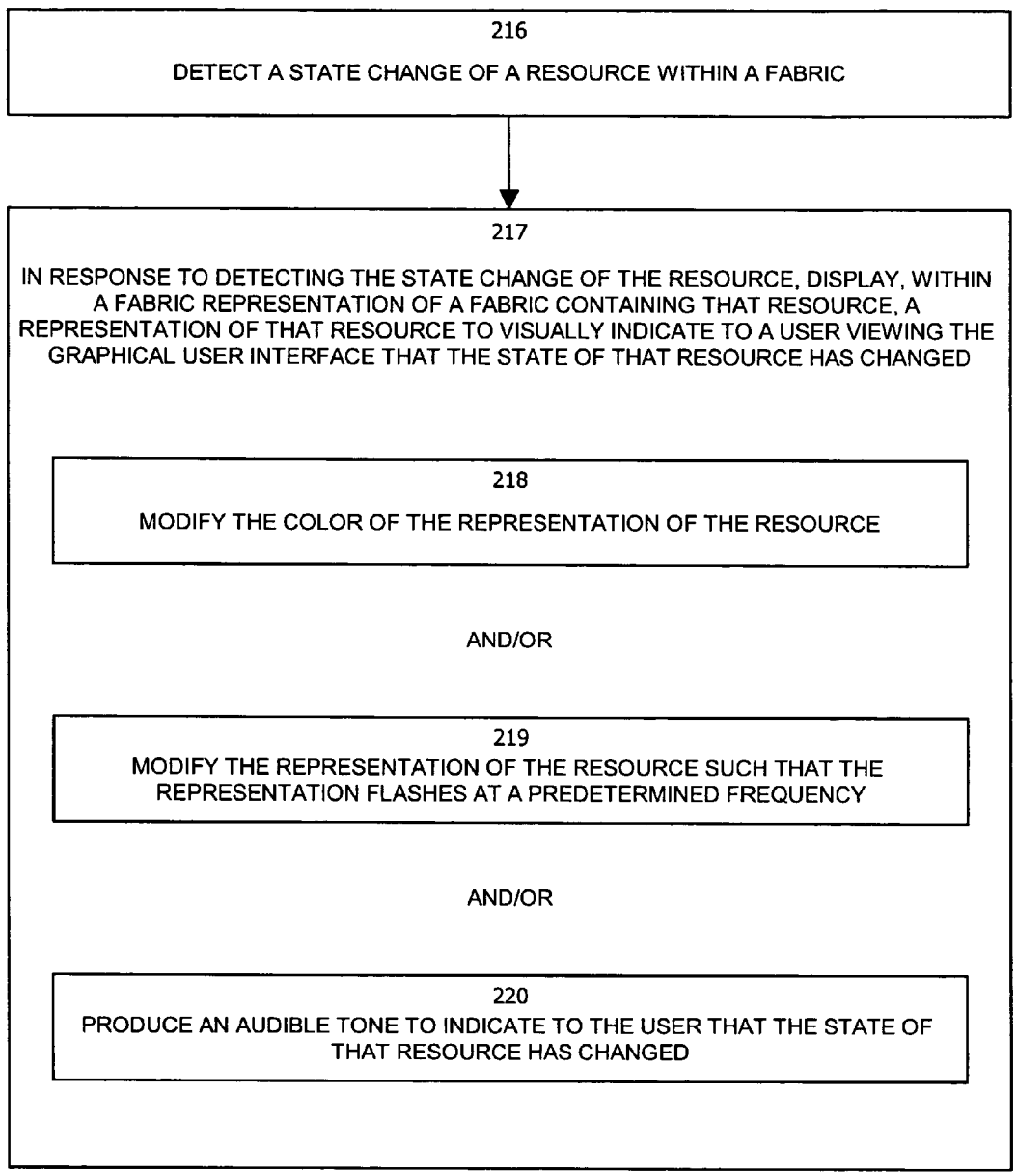
FIG. 6 is a flow chart of processing steps that shows high-level processing operations performed by the view manager process when it detects a state change within a fabric in accordance with one example configuration of the invention.

FIG. 6 is a flow chart of processing steps the view manager 150 performs to display a fabric representation, for each of the plurality of networked fabrics, in a respective fabric display region of a topology view on the graphical user interface in accordance with one example embodiment.

In step 216, the view manager 150 detects a state change of a resource within a fabric. The view manager 150 may detect the state change of a resource by employing different techniques. For instance, in one embodiment the view manager 150 actively polls the resources in a networked fabric to detect any state change that may occur. Conversely, in another example configuration the passive view manager 150 receives an interrupt from a separate process that detects a state change in a network resource.

In step 217, in response to detecting the state change of the resource, the view manger 150 displays, within a fabric representation of a fabric containing that resource, a representation of that resource to visually indicate to a user viewing the graphical user interface that the state of that resource has changed. Further details of this will now be explained in steps 218 through 220.

In step 218, the view manager 150 modifies the color of the representation of the resource. For example, in one embodiment assume that the view manager 150 represents a host computer in the graphical user interface as blue icon. Further assume that the view manager detects a state change in the host computer indicating an error in the device. In response to detecting the error, the view manager 150 modifies the color of the host computer icon from blue to red. Thus, the red icon indicates that an error has occurred in the host computer device.

In step 219, the view manager 150 modifies the representation of the resource such that the representation flashes at a predetermined frequency. In an example configuration, the view manager 150 flashes the graphical representation of a storage device icon at a rate of 2 hertz (HZ) in response to detecting an error in the physical storage device.

In step 220, the view manager produces an audible tone to indicate to the user that the state of that resource has changed. In this manner, the tone may remain audible perpetually or only for a fixed period. For instance, in one configuration the view manager 150 produces a five second audible beep in response to detecting an error in a host computer.

FIGS. 7a and 7b are flow charts of processing steps the view manager 150 performs to display a fabric representation, for each of the plurality of networked fabrics, in a respective fabric display region of a topology view on the graphical user interface in accordance with one example embodiment.

In step 230, the view manager 150 receives a selection of a layout of the topology view whereby the layout defines an arrangement of the fabric representations within the topology view. Further details of this will now be explained in steps 231 through 233.

Figure 8:
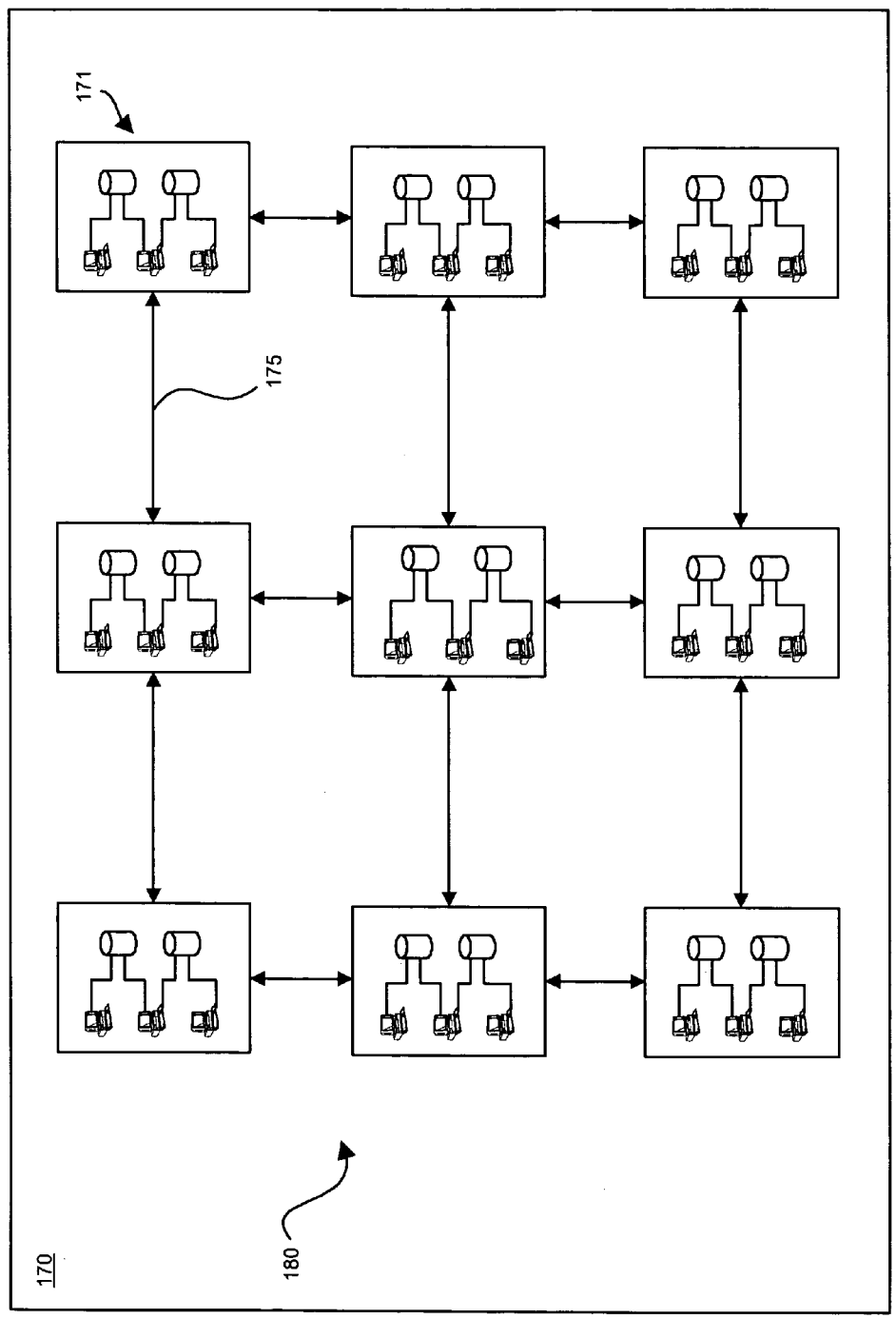
FIG. 8 is a graphical representation that illustrates one implementation of the view manager process as a graphical user interface displaying a grid topology.

In step 231, the view manager 150 receives a selection of a grid topology whereby the grid topology indicates that the fabric representations in the topology view are to be arranged in respective columnar regions. Similar to that of a matrix layout, the fabric representations are arranged in respective rows and columns in the graphical user interface 170. FIG. 8 depicts an example embodiment with a graphical user interface 170 displaying a grid topology 180 of fabric representations 171. As shown, the fabric representations 171 are arranged in respective rows and columns that form a grid-like, or matrix-like, layout.

Figure 9:
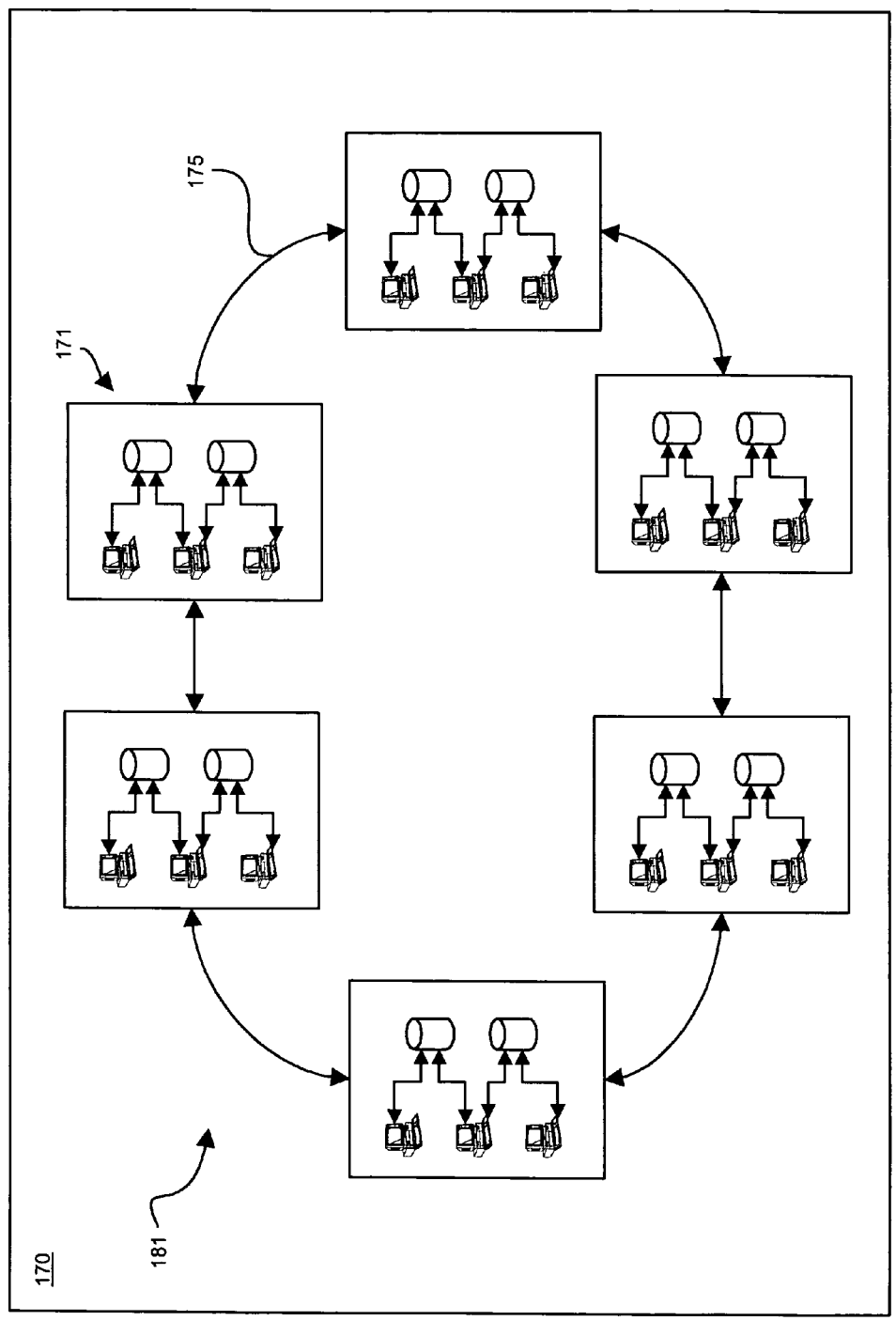
FIG. 9 is a graphical representation that illustrates one implementation of the view manager process as a graphical user interface displaying a circular topology.

In step 232, the view manager 150 receives a selection of a circular topology whereby the circular topology indicates that the fabric representations in the topology view are to be arranged in a generally circular arrangement. FIG. 9 illustrates an example embodiment with a graphical user interface 170 displaying a circular topology 181 of fabric representations 171.

In step 233, the view manager 150 receives a selection of a star topology whereby the star topology indicates that the fabric representations in the topology view are to be arranged in a star format. Similar to a hub and spoke layout, the star topology generally represents a central fabric representation connected to and surrounded by a plurality of fabric representations within the graphical user interface 170. As shown in an example embodiment in FIG. 10, the graphical user interface 170 displays a star topology 182 of fabric representations 171. In this example, a central fabric representation 171-1 is surrounded by auxiliary fabric representations 171-2 through 171-6, thus creating a star-like layout.

In step 234, the view manager 150 displays a graphical representation of interconnections between fabric representations in the topology view of each fabric of the plurality of networked fabrics. Further details of this will now be explained in steps 235 through 238.

In step 235, upon determining that the selection of the layout of the topology view is a grid topology, the view manager 150 displays graphical grid-based interconnections between the fabric representations whereby the graphical grid-based interconnections follow at least portions of grid lines between the fabric representations on the graphical user interface. In addition, the view manager 150 in one configuration can, upon determining that the selection of the layout topology view is a core-edge topology, display graphical core-edge devices in a manner that is different than devices in the network that are connected to edge nodes. In this configuration then, the topology view of a fabric shows core device in the fabric differently (e.g., smaller, or non-bold, or larger and bolder, or in another color, as a different icon, different shaped, different background, etc.) than edge devices.

FIG. 8 illustrates an example configuration with the graphical user interface 170 displaying graphical grid-based interconnections 175 shown between fabric representations 171. As shown, the graphical grid-based interconnections 175 follow at least portions of grid lines between the fabric representations 171.

In step 236, upon determining that the selection of the layout of the topology view is a star topology, the view manager 150 displays graphical star-based interconnections between the fabric representations whereby the graphical star-based interconnections extend outwards from the central fabric representation to remaining fabric representations in the topology view displayed surrounding the central fabric representation. As depicted in the example embodiment of FIG. 10, the graphical user interface 170 displays graphical star-based interconnections 175 that extend outwards from the central fabric representation 171-1 to the remaining fabric representations 171-2 though 171-6. Additionally, as exemplified in FIG. 10, at least one of the remaining fabric representations may couple to another remaining fabric representation via graphical star-based interconnection 175 (e.g., fabric representations 171-4 coupled to fabric representation 171-5 via star-based interconnections 175-6).

In step 237, upon determining that the selection of the layout of the topology view is a circular topology, the view manager 150 displays graphical arc-based interconnections between the fabric representations arranged in a generally circular manner. FIG. 9 depicts an example configuration with graphical user interface 170 displaying fabric representations 171 in a circular topology 181 and whereby each fabric representation is coupled to one another via graphical arc-based interconnections 175. It should be noted that the arc-based interconnections may appear rectilinear when respective fabric regions are positioned in a direct horizontal or vertical orientation relative to one another.

Figure 10:
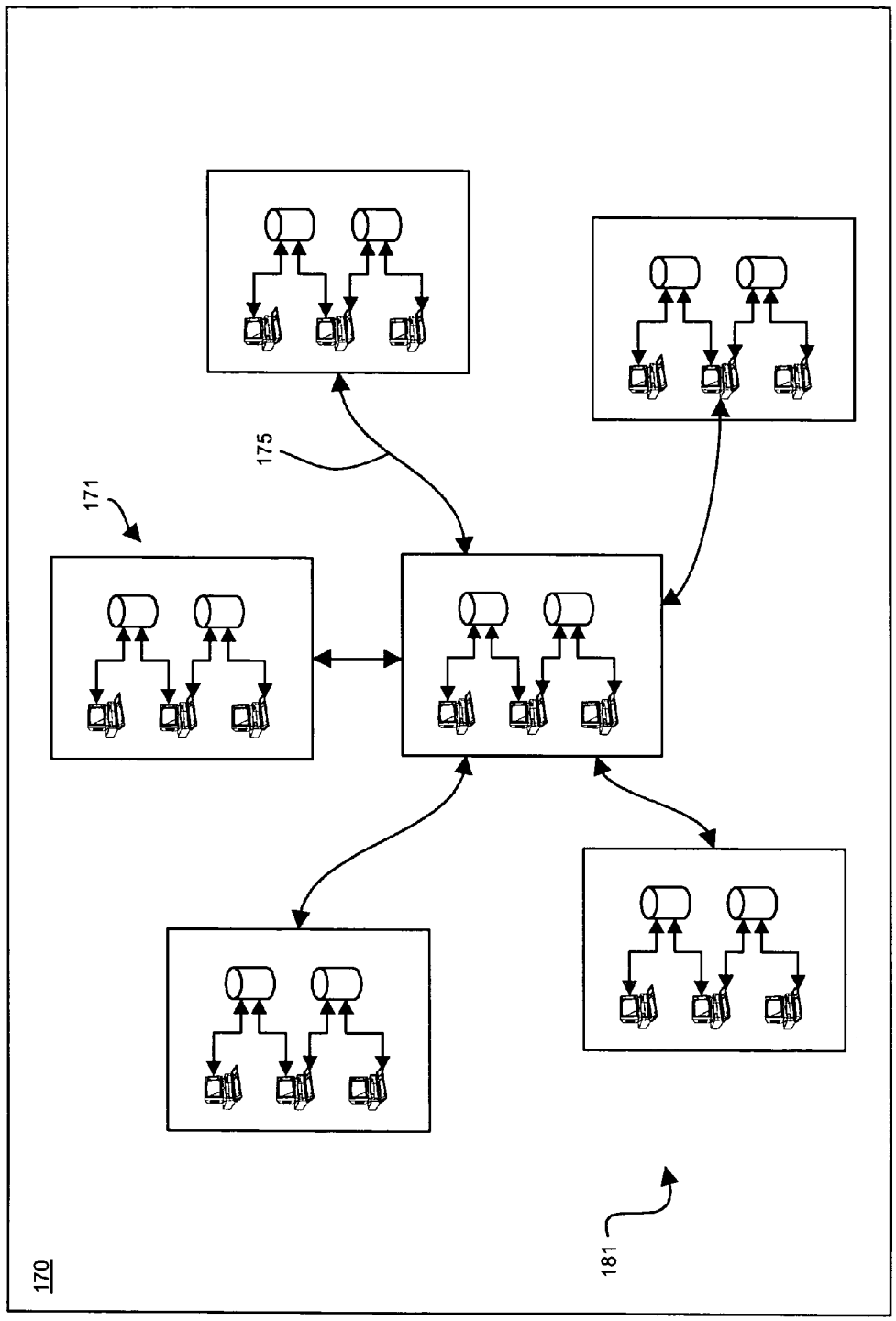
FIG. 10 is a graphical representation that illustrates one implementation of the view manager process as a graphical user interface displaying a star topology.

In step 238, in response to receiving the selection of a layout of the topology view, the view manager 150 graphically arranging the fabric representations in respective fabric display regions that conform to the layout of the topology view. Example configurations of the grid, circular and star topologies are illustrated in FIGS. 8, 9 and 10, respectively.

Figure 11:
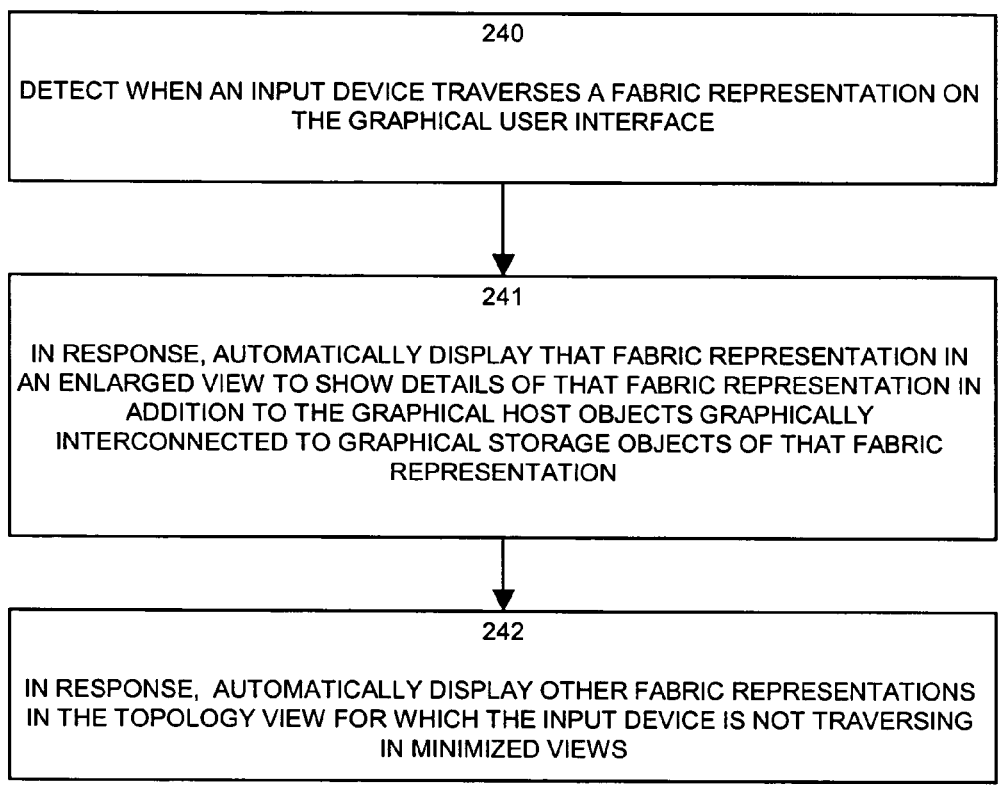
FIG. 11 is a flow chart of processing steps that shows high-level processing operations performed by the view manager process when it detects when an input device traverses a fabric representation on the graphical user interface in accordance with one example configuration of the invention.

FIG. 11 is a flow chart of processing steps the view manager 150 performs to display network information in addition to steps already discussed herein and in accordance with one example embodiment. It should be noted that the methods disclosed herein are not limited to the particular topologies that have been described thus far. In this respect, the scope of the invention contemplates topologies that are not discussed in this disclosure.

In step 240, the view manager 150 detects when an input device traverses a fabric representation on the graphical user interface. Typically, as in one embodiment, the input device 116 is a mouse and the view manager 150 detects when the mouse cursor traverses, or intersects, a fabric representation on the graphical user interface.

In sub-step 241, in response to detecting when an input device traverses a fabric representation on the graphical user interface, the view manager 150 automatically displays that fabric representation in an enlarged view to show details of that fabric representation in addition to the graphical host objects graphically interconnected to graphical storage objects of that fabric representation.

Figure 12:
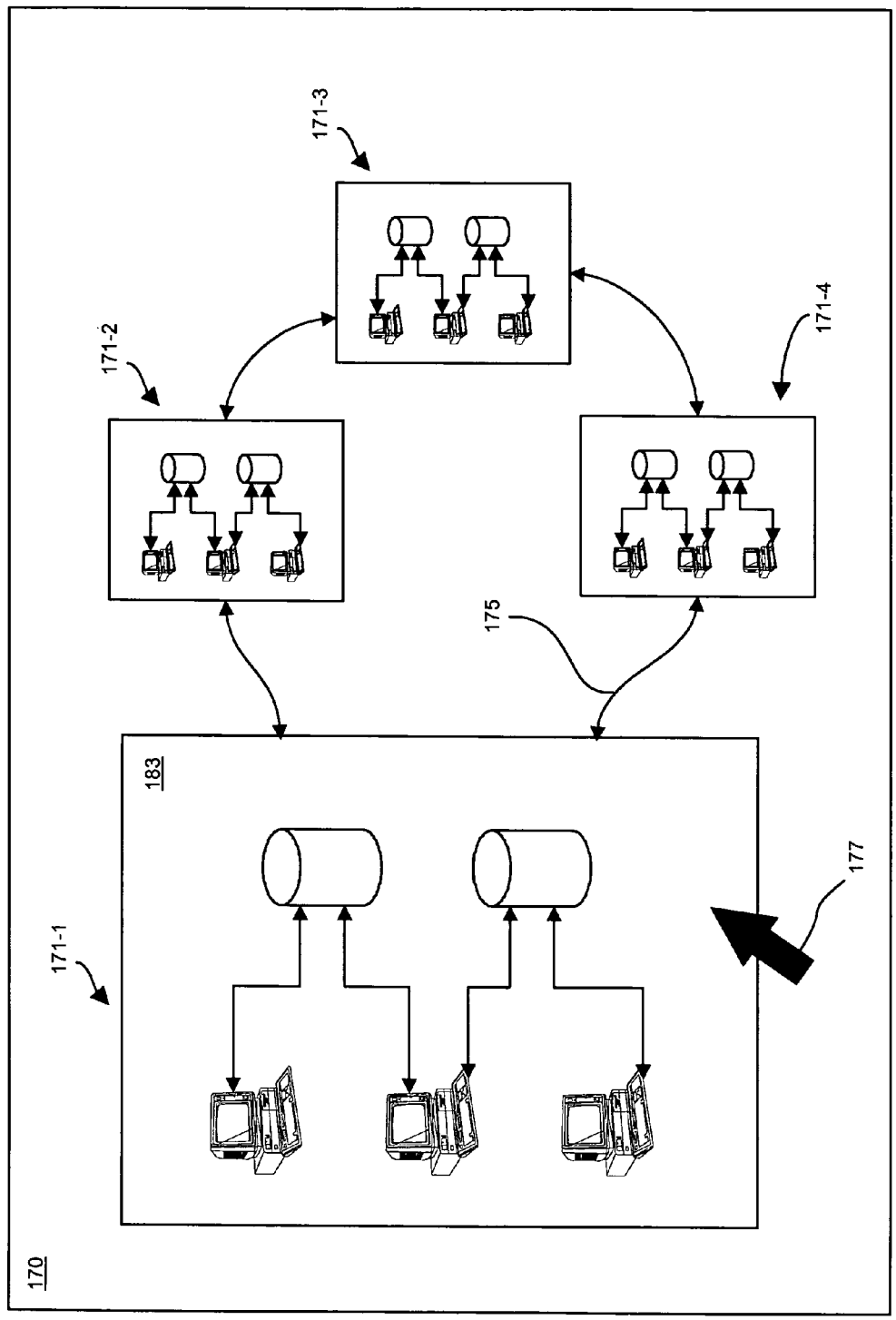
FIG. 12 is a graphical representation that illustrates one implementation of the view manager process as a graphical user interface displaying enlarged and minimized views of fabric representations.

FIG. 12 depicts an example embodiment of a graphical user interface 170 that shows a mouse cursor 177 traversing, or intersecting, an enlarged view 183 of a fabric representation 171-1. In this illustration, the view manager 150 detected that the mouse cursor 177 of input device 116 traversed the fabric representation 171-1 and, accordingly, displayed the enlarged view 183 of fabric representation 171-1. Typically, details that are included in the enlarged view include, but are not limited, resource identification information (e.g., IP address), diagnostic information (e.g., throughput data), graphical resource representations having greater illustrative details (e.g., line, shape and color definition), and the like.

In sub-step 242, in response to detecting when an input device traverses a fabric representation on the graphical user interface, the view manager 150 automatically displays other fabric representations in the topology view for which the input device is not traversing in minimized views. In essence, the view manager 150 minimizes the non-traversed fabric representations to further emphasize the enlarged view of the traversed fabric representation. Accordingly, the minimized views typically have similar sizes, but the view sizes may vary depending on the particular algorithm used by the view manager 150 in minimizing the fabric representations.

For example, FIG. 12 demonstrates an example embodiment of a graphical user interface 170 that displays minimized views 184 of fabric representations 171-2, 171-3 and 171-4, in relation to the enlarged view 183 of fabric representation 171-1. In this illustration, the view manager 150 detected that the mouse cursor 177 of input device 116 traversed the fabric representation 171-1 and, consequently, displayed the minimized views 184 of fabric representations 171-2, 171-3 and 171-4.

Figure 13:
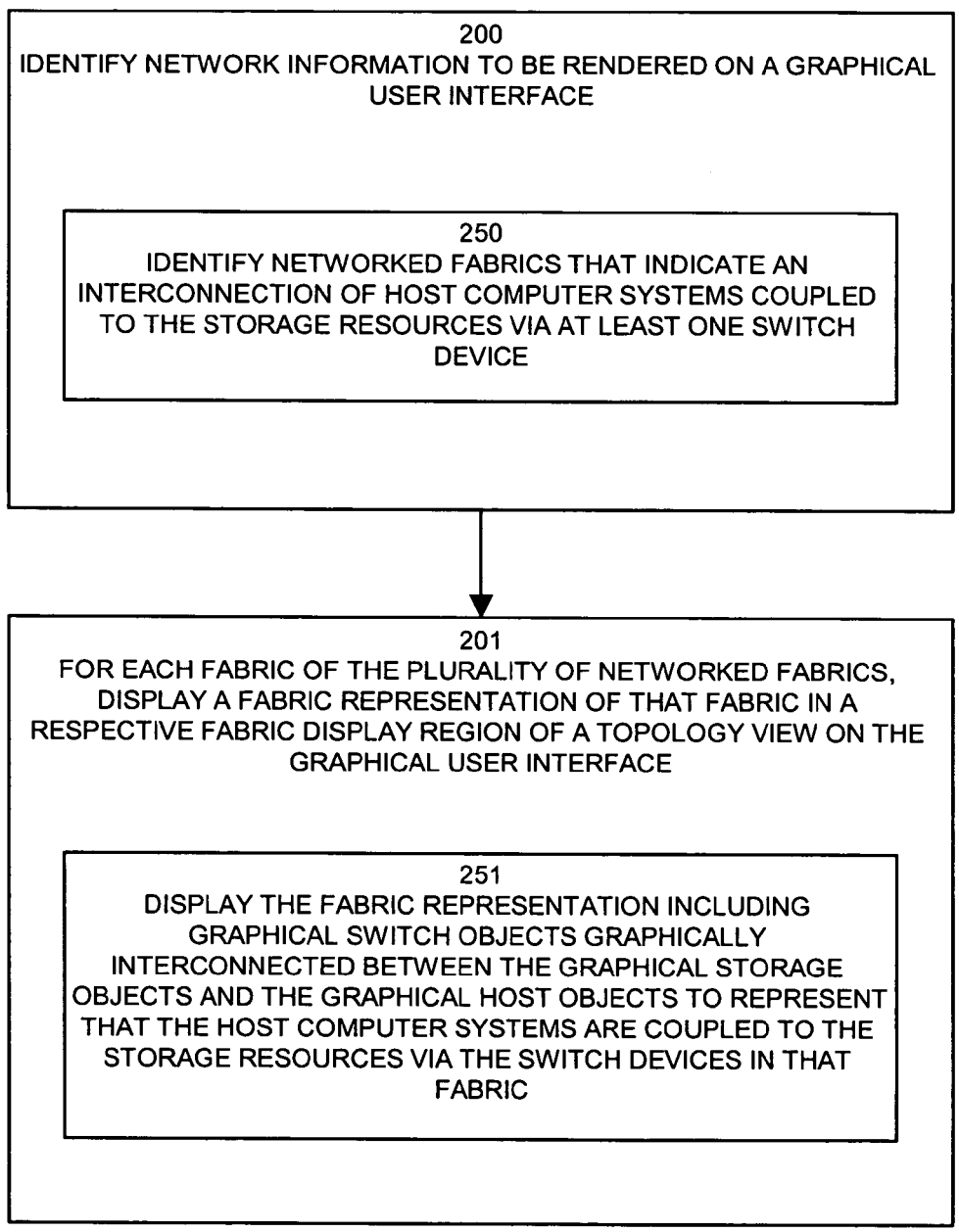
FIG. 13 is a flow chart of processing steps that shows high-level processing operations performed by the view manager process when it identifies networked fabrics that indicate an interconnection of host computer systems coupled to the storage resources via at least one switch device in accordance with one example configuration of the invention.

FIG. 13 is a flow chart of processing steps the view manager 150 performs to identify network information to be rendered on a graphical user interface in accordance with one example embodiment.

In step 250, the view manager 150 identifies networked fabrics that indicate an interconnection of host computer systems coupled to the storage resources via at least one switch device.

Figure 14:
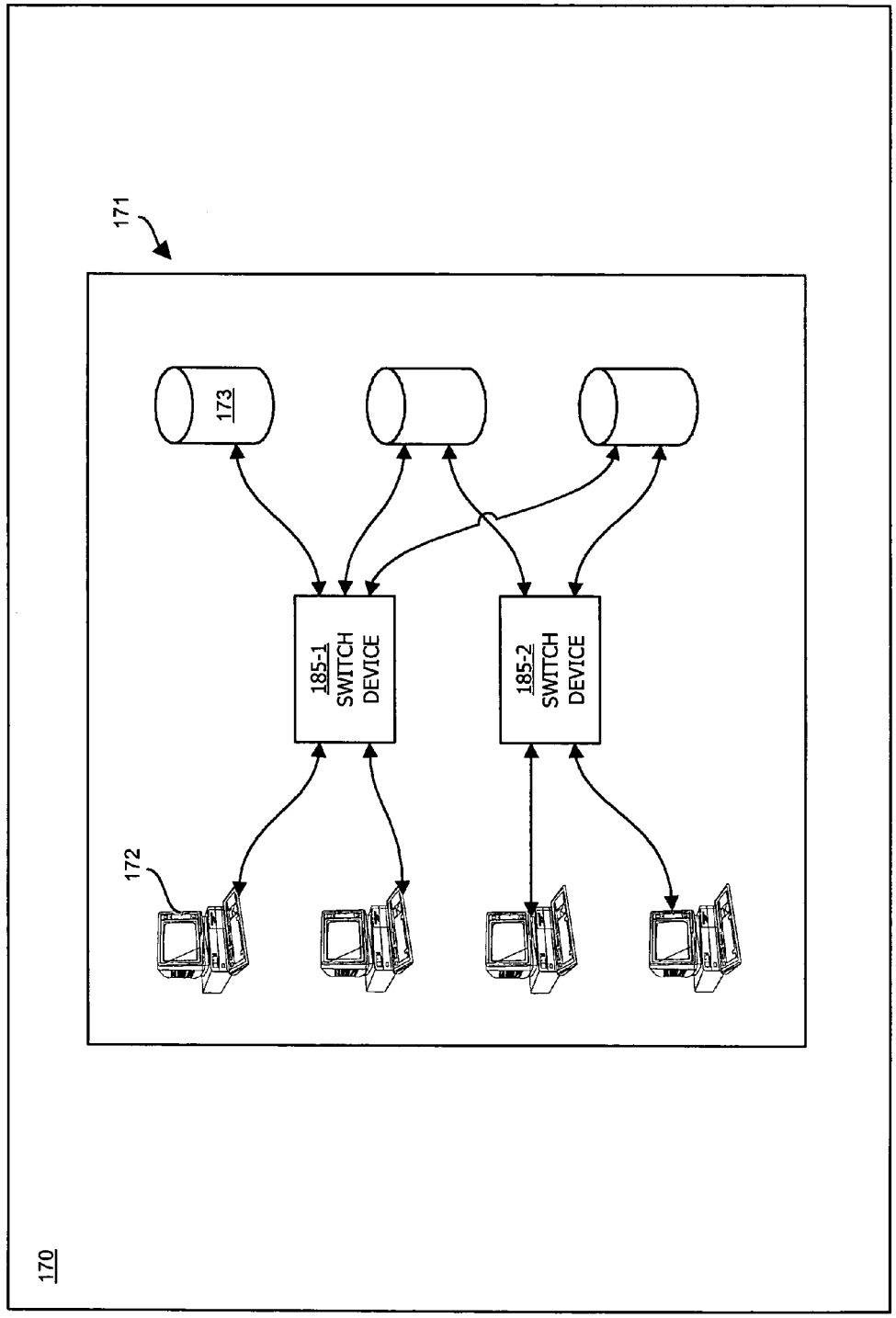
FIG. 14 is a graphical representation that illustrates one implementation of the view manager process as a graphical user interface displaying a fabric representation including graphical switch objects graphically interconnected between graphical storage objects and the graphical host objects.

In step 251, the view manager 150 displays the fabric representation including graphical switch objects graphically interconnected between the graphical storage objects and the graphical host objects to represent that the host computer systems are coupled to the storage resources via the switch devices in that fabric. As an example, FIG. 14 depicts one embodiment with a graphical user interface 170 displaying a fabric representation 171. In this specific depiction, fabric representation 171 includes host computer objects 172 coupled to storage device objects 173 via switch device objects 185. Furthermore, the switch devices objects are graphically linked to the host computer objects 172 and storage device objects 174 via graphical interconnections 174.

Figure 15:
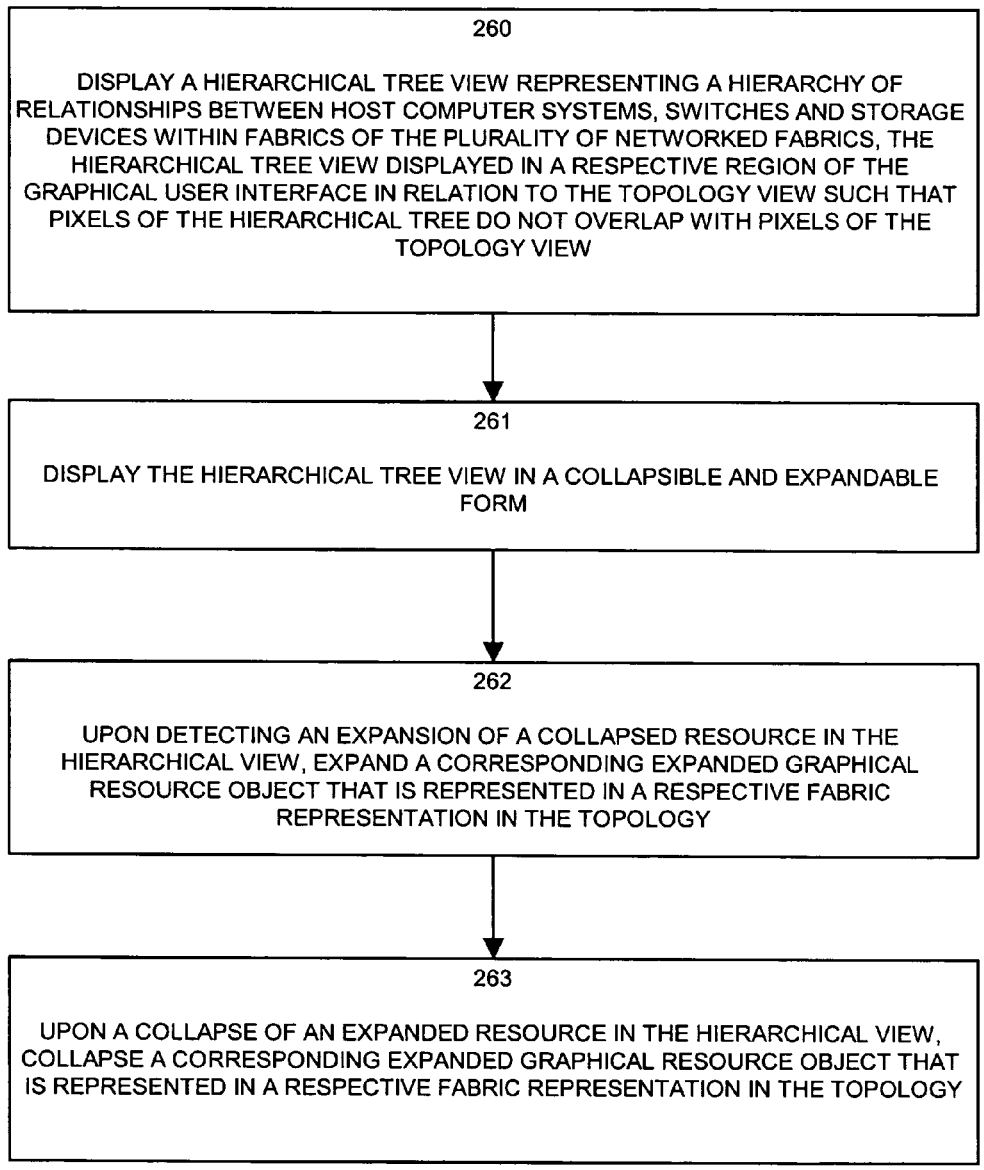
FIG. 15 is a flow chart of processing steps that shows high-level processing operations performed by the view manager process when it displays a hierarchical tree view in accordance with one example configuration of the invention.

FIG. 15 is a flow chart of processing steps the view manager 150 performs to display network information in addition to steps already discussed herein and in accordance with one example embodiment.

Figure 16:
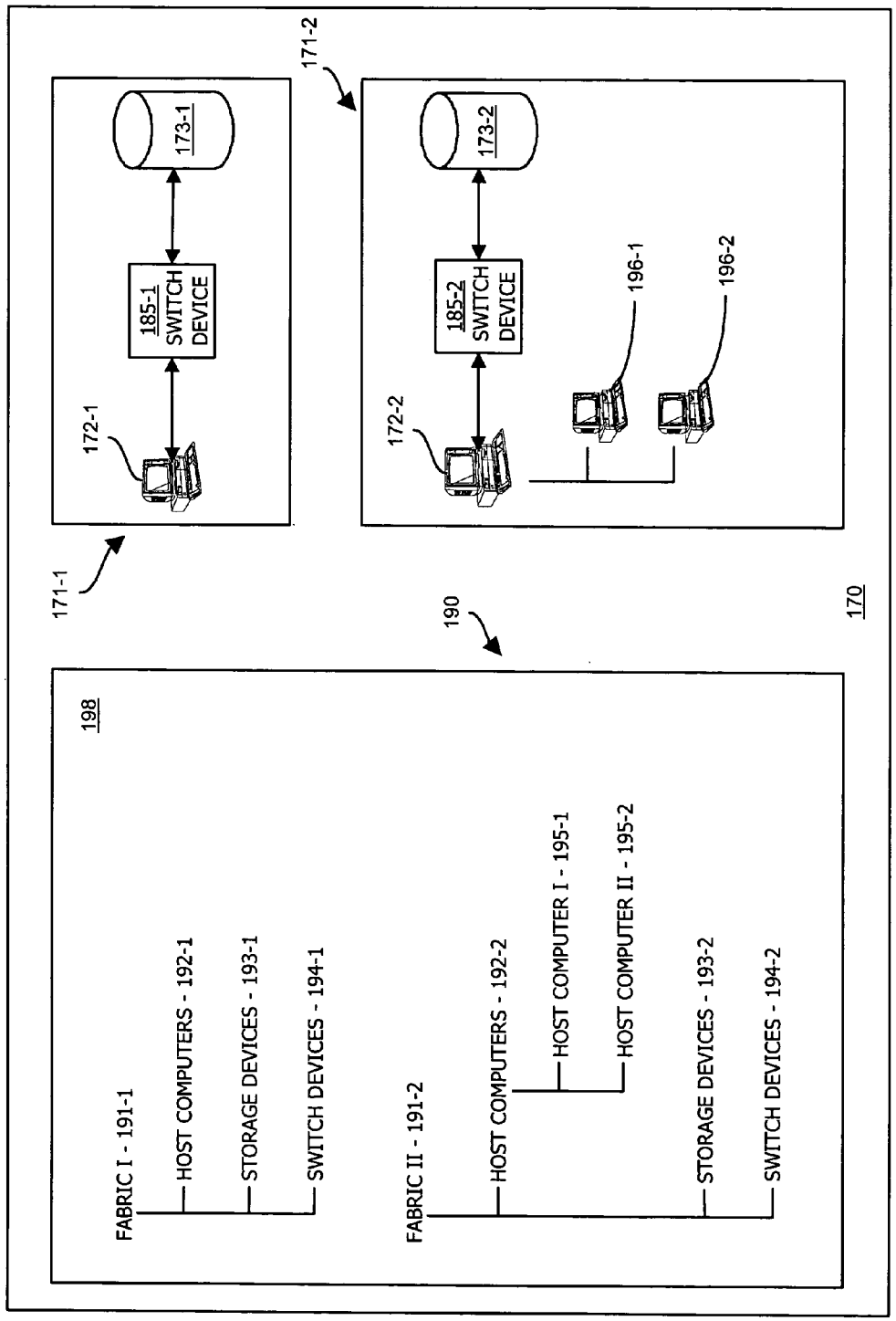
FIG. 16 is a graphical representation that illustrates one implementation of the view manager process as a graphical user interface displaying a hierarchical tree view.

In step 260, the view manager displays a hierarchical tree view representing a hierarchy of relationships between host computer systems, switches devices and storage devices within fabrics of the plurality of networked fabrics. In this respect, the hierarchical tree view is displayed in a respective region of the graphical user interface in relation to the topology view such that pixels of the hierarchical tree do not overlap with pixels of the topology view. As an example, FIG. 16 illustrates an embodiment whereby the graphical user interface 170 includes a hierarchical tree 190 that represents a hierarchy of relationships between host computer objects 172, switch device objects 185 and storage device objects 173. The view manager 150 displays the hierarchical tree 190 in a respective region 198 of the graphical user interface 170 such that pixels of hierarchical tree region 198 do not overlap with pixels of fabric representations 171-1 and 171-2.

Furthermore, the sub-element identities (e.g., host computers identity 192-2) relate to corresponding graphical objects in the fabric representation 171-2. For instance, the host computers identity 192-1 corresponds to the host computers object 172-1 in fabric representation 171-1. In addition, host computers object 172-1 represents a plurality of host computer resources included in fabric representation 171-1.

In step 261, the view manager 150 displays the hierarchical tree view in a collapsible and expandable form. The expandable form shows a set (e.g., a networked fabric) having sub-elements (e.g., host computers) such that the hierarchical tree displays the set identity followed by all sub-element identities included in that set. To illustrate this, FIG. 16 shows a first fabric identity 191-1, second fabric identity 191-2 and host computers identity 192-2 in expandable form with respective sub-elements listed below. Conversely, the collapsible form shows a set (e.g., a networked fabric) having sub-elements (e.g. host computers) such that the hierarchical tree displays the set identity but does not show, or hides, the sub-element identities. As an example, FIG. 16 shows host computers identity 192-1 in collapsible form such that any sub-element host computer identities contained in first fabric identity 191-1 are not displayed, or are hidden, in the graphical user interface 170.

In step 262, upon detecting an expansion of a collapsed resource in the hierarchical view, the view manager 150 expands a corresponding expanded graphical resource object that is represented in a respective fabric representation in the topology. As illustrated in the example configuration of FIG. 16, assume that the host computers identity 192-2 changed from a collapsible form to an expandable form such that the sub-elements (e.g., host computer I identity 195-1 and host computer II identity 195-2) are shown as part of the fabric hierarchy 190. Furthermore, upon detecting this expansion, view manager 150 expands graphical host computers object 172-2 such that the sub-elements (e.g., host computer objects 196-1 and 196-2) are displayed in fabric representation 171-2.

In step 263, upon a collapse of an expanded resource in the hierarchical view, the view manager 150 collapses a corresponding expanded graphical resource object that is represented in a respective fabric representation in the topology. In describing an example embodiment, assume that the storage devices identity 193-1 changed from an expandable form to a collapsible form such that the sub-elements (e.g., any storage device identities within first fabric identity 191-1) are not shown. In turn, upon detecting the collapse of storage devices identity 193-1, view manager 150 collapses graphical storage device object 173-1 such that the storage device object sub-elements (not shown) are hidden from view.

Figure 17:
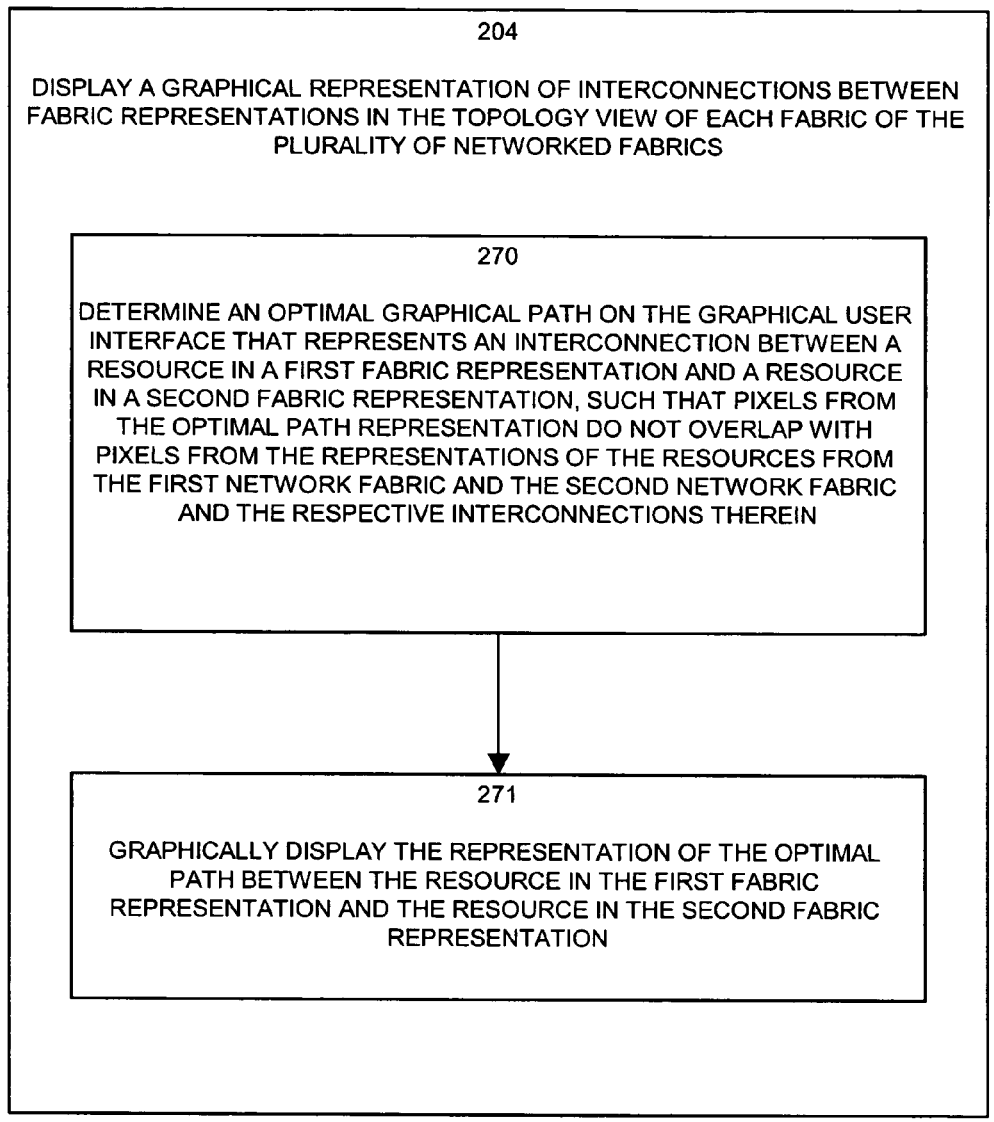
FIG. 17 is a flow chart of processing steps that shows high-level processing operations performed by the view manager process when it determines an optimal path between fabric representations in the graphical user interface in accordance with one example configuration of the invention.

FIG. 17 is a flow chart of processing steps the view manager 150 performs to display a graphical representation of interconnections between fabric representations in the topology view of each fabric of the plurality of networked fabrics in accordance with one example embodiment.

In step 270, the view manager 150 determines an optimal graphical path on the graphical user interface that represents an interconnection between a resource in a first fabric representation and a resource in a second fabric representation. In this manner, pixels from the optimal path representation do not overlap with pixels from the representations of the resources from the first network fabric and the second network fabric and the respective interconnections therein. As such, the view manager 150 uses an algorithm to determine a path between resources from separate fabric representation such that the path will not intersect lines, shapes, etc., in a fabric representation. The algorithm may use criteria (e.g., path distance and various aesthetic metrics) in determining the optimal path between two resources in separate fabrics.

In step 271, the view manager 150 graphically displays the representation of the optimal path between the resource in the first fabric representation and the resource in the second fabric representation. FIG. 18 depicts an example embodiment of a graphical user interface 170 with a first fabric representation 171-1 and second fabric representation 171-2. An optimal path representation 199 links the storage device object 173 of the first fabric representation 171-1 with the host computer object 172 of the second fabric representation 171-2. Notwithstanding the rectangles indicating the respective fabric display regions which are only displayed for demonstrative purposes, the optimal path representation 198 does not overlap or intersect a pixel (e.g., of a host computer object, switch device object, etc.) in either the first fabric representation 171-1 or the second fabric representation 171-2. It should be noted that in alternate embodiments the optimal path representation may have arcuate segments in lieu of, or in addition to, the orthogonally partitioned line segments as depicted in FIG. 18.

It is noted that example configurations disclosed herein include the view manager application 150-1 itself (i.e., in the form of un-executed or non-performing logic instructions and/or data). The view manager application 150-1 may be stored on a computer readable medium (such as a floppy disk), hard disk, electronic, magnetic, optical or other computer readable medium. The view manager application 150-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the view manager application 150-1 in the processor 113 as the view manager process 150-2. In another alternative configuration, the view manager process 150-2 may be embedded in the operating system or may operate as a separate process from the application and may track all user input or only some user input (such as mouse movement or clicks, but not keyboard input). Those skilled in the art will understand that the computer system 110 may include other processes and/or software and hardware components, such as an operating system not shown in this example.

While configurations of the system and method have been particularly shown and described with references to configurations thereof, it will be understood by those skilled in the art that various changes in form and details may be made therein without departing from the scope of the invention. Accordingly, the present invention is not intended to be limited by the example configurations provided above.

What is claimed is:

1. A computer-implemented method in which a computer system initiates execution of software instructions stored in memory for displaying network information, the computer-implemented method comprising:

identifying network information to be rendered on a graphical user interface, the network information identifying a plurality of networked fabrics, each networked fabric indicating an interconnection of host computer systems mapped to storage resources;

for each fabric of the plurality of networked fabrics, concurrently displaying a fabric representation of that fabric in a respective fabric display region of a topology view on the graphical user interface, the representation of each fabric in each respective fabric display region including graphical host objects graphically interconnected to graphical storage objects to represent the host computer systems mapped to the storage resources in the fabric represented in that fabric display region, concurrently displaying the fabric representation comprises:

detecting a state change of a resource within a fabric;

in response to detecting the state change of the resource, displaying, within a fabric representation of a fabric containing that resource, a representation of that resource to visually indicate on the graphical user interface that the state of that resource has changed;

receiving a selection of a layout of the topology view, the layout defining an arrangement of the fabric representations within the topology view;

in response to receiving the selection of a layout of the topology view, graphically arranging the fabric representations in respective fabric display regions that conform to the layout of the topology view;

wherein receiving the selection of the layout of the topology view comprises at least one of:
  i) receiving a selection of a grid topology, the grid topology indicating that the fabric representations in the topology view are to be arranged in respective columnar regions;
  ii) receiving a selection of a circular topology, the circular topology indicating that the fabric representations in the topology view are to be arranged in a generally circular arrangement; and
  iii) receiving a selection of a star topology, the star topology indicating that the fabric representations in the topology view are to be arranged in star format;

displaying a graphical representation of interconnections between the concurrently displayed fabric representations in the topology view of each fabric of the plurality of networked fabrics;

receiving an input relative to a graphical object displayed in one of the fabric representations, the graphical object being one of the graphical host objects or graphical storage objects within the fabric representation;

determining a state associated with the graphical object for which the input was received;

determining if the state includes information that should be displayed relative to the graphical object; and if the state includes information that should be displayed relative to the graphical object, displaying the information from the state on the graphical user interface in relation to the graphical object.

2. The computer-implemented method of claim 1 wherein displaying, within a fabric representation of a fabric containing that resource, a representation of that resource to visually indicate to a user viewing the graphical user interface that the state of that resource has changed comprises at least one of:
  modifying the color of the representation of the resource;
  modifying the representation of the resource such that the representation flashes at a predetermined frequency; and
  producing an audible tone to indicate to the user that the state of that resource has changed.

3. The computer-implemented method of claim 1 wherein receiving an input relative to a graphical object displayed in one of the fabric representations comprises:
  receiving input from an input device at a time when a graphical orientation of the input device traverses at least one pixel in an area substantially the same as the area defined by the graphical object; and
  wherein determining if the state includes information that should be displayed relative to the graphical object comprises:
  upon receiving input from the input device, automatically displaying the information from the state on the graphical user interface in relation to the graphical object.

4. The computer-implemented method of claim 1 wherein for each fabric of the plurality of networked fabrics, displaying a fabric representation of that fabric in a respective fabric display region of a topology view on the graphical user interface comprises:
  displaying a first fabric in a first fabric display region in a first format; and
  displaying a second fabric in a second fabric display region in a second format different than that of the first format, the pixels of the second fabric display region displayed in a non-overlapping format with pixels of the first fabric display region.

5. The computer-implemented method of claim 1 wherein for each fabric of the plurality of networked fabrics, displaying a fabric representation of that fabric in a respective fabric display region of a topology view on the graphical user interface comprises:
  receiving a selection of a layout of the topology view, the layout defining an arrangement of the fabric representations within the topology view; and
  in response to receiving the selection of a layout of the topology view, graphically arranging the fabric representations in respective fabric display regions that conform to the layout of the topology view;
  wherein receiving a selection of a layout of the topology view comprises at least one of:
    i) receiving a selection of a grid topology, the grid topology indicating that the fabric representations in the topology view are to be arranged in respective columnar regions;
    ii) receiving a selection of a circular topology, the circular topology indicating that the fabric representations in the topology view are to be arranged in a generally circular arrangement;
    iii) receiving a selection of a star topology, the star topology indicating that the fabric representations in the topology view are to be arranged in star format; and
  wherein displaying a graphical representation of interconnections between the concurrently displayed fabric representation in the topology view of each fabric of the plurality of networked fabrics comprises at least one of:
  upon determining that the selection of the layout of the topology view is a grid topology, displaying graphical grid-based interconnections between the fabric representations, the graphical grid-based interconnections following at least portions of grid lines between the fabric representations on the graphical user interface;
  upon determining that the selection of the layout topology view is a core-edge topology, displaying graphical core-edge devices in a manner that is different than devices in the network that are connected to edge nodes;
  upon determining that the selection of the layout of the topology view is a star topology, displaying graphical star-based interconnections between the fabric representations, the graphical star-based interconnections extending outwards from the central fabric representation to remaining fabric representations in the topology view displayed surrounding the central fabric representation; and
  upon determining that the selection of the layout of the topology view is a circular topology, displaying graphical arc-based interconnections between the fabric representations arranged in a generally circular manner.

6. The computer-implemented method of claim 1 comprising:
  detecting when an input device traverses a fabric representation on the graphical user interface; and
  in response:
    i) automatically displaying that fabric representation in an enlarged view to show details of that fabric representation in addition to the graphical host objects graphically interconnected to graphical storage objects of that fabric representation; and ii) automatically displaying other fabric representations in the topology view for which the input device is not traversing in minimized views.

7. The computer-implemented method of claim 1 wherein identifying network information to be rendered on a graphical user interface comprises:
identifying networked fabrics that indicate an interconnection of host computer systems coupled to the storage resources via at least one switch device; and
wherein for each fabric of the plurality of networked fabrics, displaying a fabric representation of that fabric in a respective fabric display region of a topology view on the graphical user interface comprises:
displaying the fabric representation including graphical switch objects graphically interconnected between the graphical storage objects and the graphical host objects to represent that the host computer systems are coupled to the storage resources via the switch devices in that fabric.

8. The computer-implemented method of claim 1 comprising:
displaying a hierarchical tree view representing a hierarchy of relationships between host computer systems, switches and storage devices within fabrics of the plurality of networked fabrics, the hierarchical tree view displayed in a respective region of the graphical user interface in relation to the topology view such that pixels of the hierarchical tree do not overlap with pixels of the topology view;
displaying the hierarchical tree view in a collapsible and expandable form;
upon detecting an expansion of a collapsed resource in the hierarchical view, expanding a corresponding expanded graphical resource object that is represented in a respective fabric representation in the topology; and
upon a collapse of an expanded resource in the hierarchical view, collapsing a corresponding expanded graphical resource object that is represented in a respective fabric representation in the topology.

9. The computer-implemented method of claim 8, further comprising:
detecting when an input device traverses a fabric representation on the graphical user interface; and
in response:
i) automatically displaying that fabric representation in an enlarged view to show details of that fabric representation in addition to the graphical host objects graphically interconnected to graphical storage objects of that fabric representation; and
ii) automatically displaying other fabric representations in the topology view for which the input device is not traversing in minimized views;
wherein identifying network information to be rendered on a graphical user interface comprises:
identifying networked fabrics that indicate an interconnection of host computer systems coupled to the storage resources via at least one switch device;
wherein for each fabric of the plurality of networked fabrics, displaying a fabric representation of that fabric in a respective fabric display region of a topology view on the graphical user interface comprises:
displaying the fabric representation including graphical switch objects graphically interconnected between the graphical storage objects and the graphical host objects to represent that the host computer systems are coupled to the storage resources via the switch devices in that fabric;
wherein for each fabric of the plurality of networked fabrics, displaying a fabric representation of that fabric in a respective fabric display region of a topology view on the graphical user interface comprises:
displaying a first fabric in a first fabric display region in a first format; and
displaying a second fabric in a second fabric display region in a second format different than that of the first format, the pixels of the second fabric display region displayed in a non-overlapping format with pixels of the first fabric display region;
wherein displaying the graphical representation of interconnections between the concurrently displayed fabric representations in the topology view of each fabric of the plurality of networked fabrics comprises:
determining an optimal graphical path on the graphical user interface that represents an interconnection between a resource in a first fabric representation and a resource in a second fabric representation, such that pixels from the optimal path representation do not overlap with pixels from the representations of the resources from the first network fabric and the second network fabric and the respective interconnections therein; and
graphically displaying the representation of the optimal path between the resource in the first fabric representation and the resource in the second fabric representation.

10. The computer-implemented method of claim 1 wherein displaying a graphical representation of interconnections between the concurrently displayed fabric representations in the topology view of each fabric of the plurality of networked fabrics comprises:
determining an optimal graphical path on the graphical user interface that represents an interconnection between a resource in a first fabric representation and a resource in a second fabric representation, such that pixels from the optimal path representation do not overlap with pixels from the representations of the resources from the first network fabric and the second network fabric and the respective interconnections therein; and
graphically displaying the representation of the optimal path between the resource in the first fabric representation and the resource in the second fabric representation.

11. The computer-implemented method of claim 10, wherein determining the optimal graphical path on the graphical user interface that represents an interconnection between a resource in a first fabric representation and a resource in a second fabric representation includes using an algorithm to determine the optimal graphical path based on path distance criteria and at least one aesthetic metric.

12. The computer-implemented method of claim 1, wherein for each fabric of the plurality of networked fabrics, displaying a fabric representation of that fabric in a respective fabric display region of a topology view on the graphical user interface comprises:
wherein displaying the graphical representation of interconnections between the concurrently displayed fabric representations in the topology view of each fabric of the plurality of networked fabrics comprises at least one of:
upon determining that the selection of the layout of the topology view is a grid topology, displaying graphical grid-based interconnections between the fabric representations, the graphical grid-based interconnections following at least portions of grid lines between the fabric representations on the graphical user interface;

upon determining that the selection of the layout topology view is a core-edge topology, displaying graphical core-edge devices in a manner that is different than devices in the network that are connected to edge nodes;

upon determining that the selection of the layout of the topology view is a star topology, displaying graphical star-based interconnections between the fabric representations, the graphical star-based interconnections extending outwards from the central fabric representation to remaining fabric representations in the topology view displayed surrounding the central fabric representation; and upon determining that the selection of the layout of the topology view is a circular topology, displaying graphical arc-based interconnections between the fabric representations arranged in a generally circular manner.

13. The computer-implemented method of claim 12, further comprising:

detecting when an input device traverses a fabric representation on the graphical user interface; and in response:
i) automatically displaying that fabric representation in an enlarged view to show details of that fabric representation in addition to the graphical host objects graphically interconnected to graphical storage objects of that fabric representation; and
ii) automatically displaying other fabric representations in the topology view for which the input device is not traversing in minimized views.

14. The computer-implemented method of claim 1, further comprising:

displaying a hierarchical tree view representing a hierarchy of relationships between host computer systems, switches and storage devices within fabrics of the plurality of networked fabrics, the hierarchical tree view displayed in a respective region of the graphical user interface in relation to the topology view such that pixels of the hierarchical tree do not overlap with pixels of the topology view;

displaying the hierarchical tree view in a collapsible and expandable form; upon detecting an expansion of a collapsed resource in the hierarchical view, expanding a corresponding expanded graphical resource object that is represented in a respective fabric representation in the topology; and upon a collapse of an expanded resource in the hierarchical view, collapsing a corresponding expanded graphical resource object that is represented in a respective fabric representation in the topology.

15. A computer system comprising:

a memory;

a processor;

an interconnection mechanism coupling the memory and the processor allowing communication there between;

wherein the memory is encoded with an view manager application that when executed in the processor, provides a view manager process, the view manger process, when executed, processes data by causing the computer system to perform the operations of:

identifying network information to be rendered on a graphical user interface, the network information identifying a plurality of networked fabrics, each networked fabric indicating an interconnection of host computer systems mapped to storage resources;

for each fabric of the plurality of networked fabrics, displaying a fabric representation of that fabric in a respective fabric display region of a topology view on the graphical user interface, the representation of each fabric in each respective fabric display region including graphical host objects graphically interconnected to graphical storage objects to represent the host computer systems mapped to the storage resources in the fabric represented in that fabric display region, displaying the fabric representation comprises:

receiving a selection of a layout of the topology view, the layout defining an arrangement of the fabric representations within the topology view;

in response to receiving the selection of a layout of the topology view, graphically arranging the fabric representations in respective fabric display regions that conform to the layout of the topology view;

wherein receiving a selection of a layout of the topology view comprises at least one of:
i) receiving a selection of a grid topology, the grid topology indicating that the fabric representations in the topology view are to be arranged in respective columnar regions;
ii) receiving a selection of a circular topology, the circular topology indicating that the fabric representations in the topology view are to be arranged in a generally circular arrangement;
iii) receiving a selection of a star topology, the star topology indicating that the fabric representations in the topology view are to be arranged in star format; and displaying a first fabric in a first fabric display region in a first format;

displaying a second fabric in a second fabric display region in a second format different than that of the first format, the pixels of the second fabric display region displayed in a non-overlapping format with pixels of the first fabric display region; and displaying a graphical representation of interconnections between fabric representations in the topology view of each fabric of the plurality of networked fabrics.

16. The computer system of claim 15 wherein for each fabric of the plurality of networked fabrics, displaying a fabric representation of that fabric in a respective fabric display region of a topology view on the graphical user interface comprises:

wherein displaying a graphical representation of interconnections between fabric representation in the topology view of each fabric of the plurality of networked fabrics comprises:

upon determining that the selection of the layout of the topology view is a grid topology, displaying graphical grid-based interconnections between the fabric representations, the graphical grid-based interconnections following at least portions of grid lines between the fabric representations on the graphical user interface;

upon determining that the selection of the layout topology view is a core-edge topology, displaying graphical core-edge devices in a manner that is different than devices in the network that are connected to edge nodes;

upon determining that the selection of the layout of the topology view is a star topology, displaying graphical star-based interconnections between the fabric representations, the graphical star-based interconnections extending outwards from the central fabric representation to remaining fabric representations in the topology view displayed surrounding the central fabric representation; and upon determining that the selection of the layout of the topology view is a circular topology, displaying graphical arc-based interconnections between the fabric representations arranged in a generally circular manner.

17. A computer readable medium including computer program logic encoded thereon that provides an application that, upon executing in a processor, provides view manager process that processes data by causing a computer system to perform the operations of:

identifying network information to be rendered on a graphical user interface, the network information identifying a plurality of networked fabrics, each networked fabric indicating an interconnection of host computer systems mapped to storage resources;

for each fabric of the plurality of networked fabrics, displaying a fabric representation of that fabric in a respective fabric display region of a topology view on the graphical user interface, the representation of each fabric in each respective fabric display region including graphical host objects graphically interconnected to graphical storage objects to represent the host computer systems mapped to the storage resources in the fabric represented in that fabric display region, displaying the fabric representation comprises:

receiving a selection of a layout of the topology view, the layout defining an arrangement of the fabric representations within the topology view;

in response to receiving the selection of a layout of the topology view, graphically arranging the fabric representations in respective fabric display regions that conform to the layout of the topology view;

wherein receiving a selection of a layout of the topology view comprises at least one of:

i) receiving a selection of a grid topology, the grid topology indicating that the fabric representations in the topology view are to be arranged in respective columnar regions;

ii) receiving a selection of a circular topology, the circular topology indicating that the fabric representations in the topology view are to be arranged in a generally circular arrangement;

iii) receiving a selection of a star topology, the star topology indicating that the fabric representations in the topology view are to be arranged in star format;

displaying a graphical representation of interconnections between fabric representations in the topology view of each fabric of the plurality of networked fabrics;

displaying a hierarchical tree view representing a hierarchy of relationships between host computer systems, switches and storage devices within fabrics of the plurality of networked fabrics, the hierarchical tree view displayed in a respective region of the graphical user interface in relation to the topology view such that pixels of the hierarchical tree do not overlap with pixels of the topology view;

displaying the hierarchical tree view in a collapsible and expandable form;

upon detecting an expansion of a collapsed resource in the hierarchical view, expanding a corresponding expanded graphical resource object that is represented in a respective fabric representation in the topology; and upon a collapse of an expanded resource in the hierarchical view, collapsing a corresponding expanded graphical resource object that is represented in a respective fabric representation in the topology.

18. The computer readable medium of claim 17 wherein for each fabric of the plurality of networked fabrics, displaying a fabric representation of that fabric in a respective fabric display region of a topology view on the graphical user interface comprises:

wherein displaying a graphical representation of interconnections between fabric representation in the topology view of each fabric of the plurality of networked fabrics comprises:

upon determining that the selection of the layout of the topology view is a grid topology, displaying graphical grid-based interconnections between the fabric representations, the graphical grid-based interconnections following at least portions of grid lines between the fabric representations on the graphical user interface;

upon determining that the selection of the layout topology view is a core-edge topology, displaying graphical core-edge devices in a manner that is different than devices in the network that are connected to edge nodes;

upon determining that the selection of the layout of the topology view is a star topology, displaying graphical star-based interconnections between the fabric representations, the graphical star-based interconnections extending outwards from the central fabric representation to remaining fabric representations in the topology view displayed surrounding the central fabric representation; and upon determining that the selection of the layout of the topology view is a circular topology, displaying graphical arc-based interconnections between the fabric representations arranged in a generally circular manner.

* * * * *